United States Patent
Hay et al.

(10) Patent No.: US 12,416,524 B2
(45) Date of Patent: Sep. 16, 2025

(54) BEAM QUALITY MONITORING AND MULTIPLE LASER BEAM LOCATION REGISTRATION FOR HIGH-SPEED, TRAVELING, LASER FOCAL SPOTS

(71) Applicant: Edison Welding Institute, Inc., Columbus, OH (US)

(72) Inventors: Jacob C. Hay, Columbus, OH (US); Ron Aman, Columbus, OH (US); Stanley L. Ream, Columbus, OH (US)

(*) Notice: Subject to any disclaimer, the term of this patent is extended or adjusted under 35 U.S.C. 154(b) by 170 days.

(21) Appl. No.: 18/144,328

(22) Filed: May 8, 2023

(65) Prior Publication Data

US 2023/0358604 A1    Nov. 9, 2023

Related U.S. Application Data

(60) Provisional application No. 63/339,659, filed on May 9, 2022.

(51) Int. Cl.
| | |
|---|---|
| *G01J 1/42* | (2006.01) |
| *B23K 26/70* | (2014.01) |
| *B33Y 30/00* | (2015.01) |
| *B33Y 50/00* | (2015.01) |

(52) U.S. Cl.
CPC .......... *G01J 1/4257* (2013.01); *B23K 26/705* (2015.10); *B33Y 30/00* (2014.12); *B33Y 50/00* (2014.12)

(58) Field of Classification Search
CPC ........ G01J 1/4257; B33Y 30/00; B33Y 50/00; B23K 26/705
See application file for complete search history.

(56) References Cited

U.S. PATENT DOCUMENTS

| | | | |
|---|---|---|---|
| 10,627,311 B2 * | 4/2020 | Ream | B29C 64/393 |
| 2017/0173737 A1 | 6/2017 | Gray | |
| 2019/0105843 A1 | 4/2019 | Saharan et al. | |
| 2019/0301970 A1 | 10/2019 | Ream et al. | |
| 2021/0223140 A1 | 7/2021 | Ream et al. | |

OTHER PUBLICATIONS

International Search Report and Written Opinion of the International Searching Authority for International Patent App. No. PCT/US2023/021407 dated as mailed on Jul. 18, 2023 (9 pages).

* cited by examiner

*Primary Examiner* — Kevin K Pyo

(57) ABSTRACT

A system for analyzing laser beam characteristics in high-speed laser motion systems, wherein the high-speed laser motion systems comprise multiple lasers each having a field of view that generates non-stationary laser beams and a build platform positioned at a predetermined location relative to the non-stationary laser beams, comprising at least one mounted pin-hole sensor that receives laser light generated by the non-stationary laser beams; an actuation device that includes either: the at least one pin-hole sensor; or an optical device that directs the laser light to the at least one pin-hole sensor; and wherein the actuation device is actuated into an operating environment above the build platform.

20 Claims, 18 Drawing Sheets

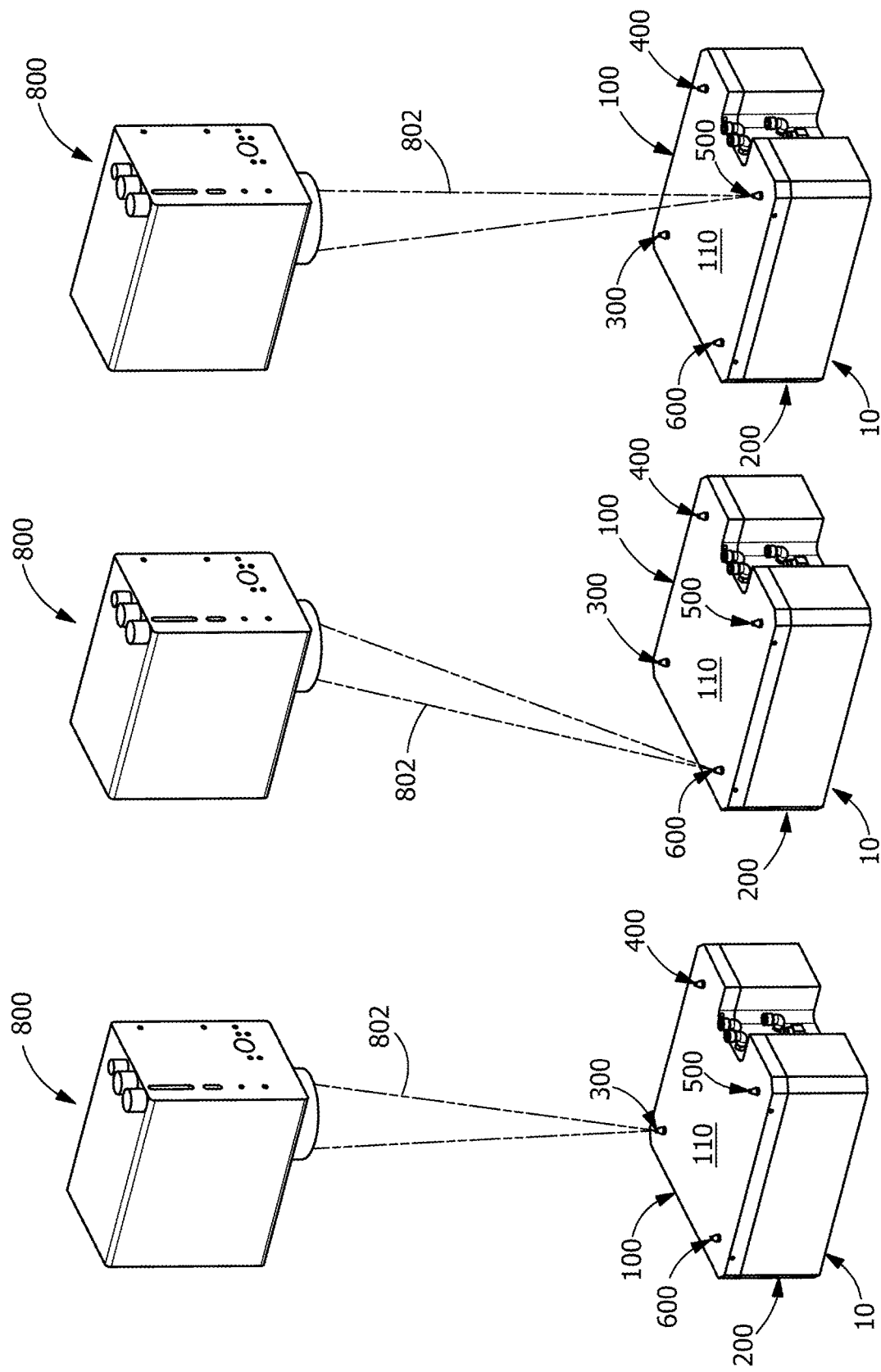

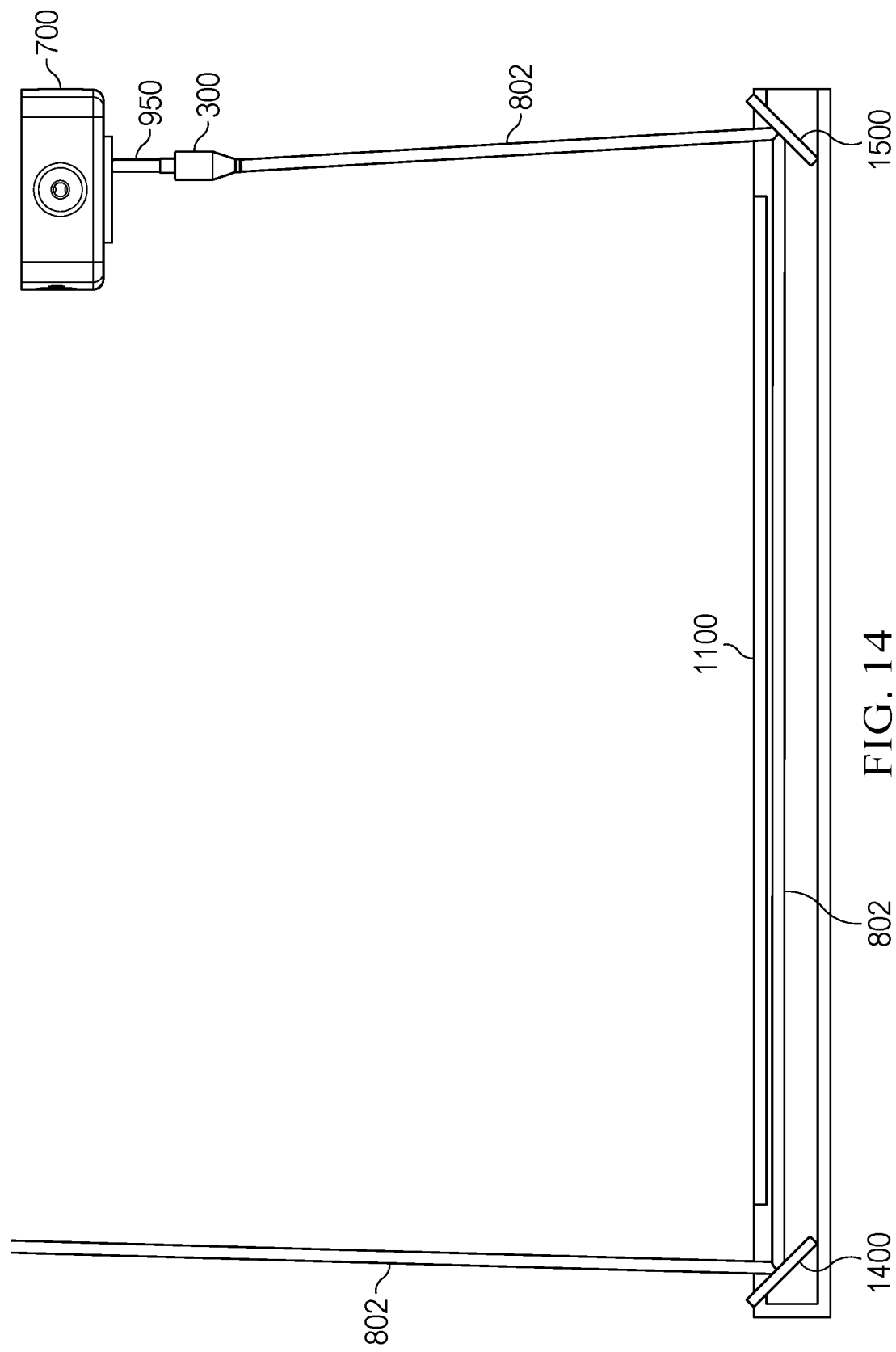

BEAM QUALITY MONITORING AND MULTIPLE LASER BEAM LOCATION REGISTRATION FOR HIGH-SPEED, TRAVELING, LASER FOCAL SPOTS

CROSS-REFERENCE TO RELATED APPLICATIONS

This patent application claims the benefit of U.S. Provisional Patent Application Ser. No. 63/339,659 filed on May 9, 2022 and entitled "Beam Quality Monitoring and Multiple Laser Beam Location Registration of High-Speed, Traveling, Laser Focal Spots", the disclosure of which is hereby incorporated by reference herein in its entirety and made part of the present U.S. utility patent application for all purposes.

BACKGROUND

The disclosed technology relates in general to laser systems having high speed beam motion capability and more specifically to systems, devices, and methods for characterizing, analyzing, and verifying proper functioning and performance of laser focal spots used in laser processing systems having high speed motion capability.

Laser processing typically includes using a laser beam to modify a work piece in a predetermined manner. Laser processing ranges from high-intensity laser ablation processes to significantly lower intensity processes such as heat treating, in which melting is avoided. Nearly all laser processing techniques involve forming the laser beam into a focal spot, e.g., specific size and shape at a particular location or working distance from the laser system. Precise identification of the location where a laser system will create a focal spot having the desired characteristics is an important aspect of creating an efficient and optimized laser process.

Laser processing techniques include laser beam welding (LBW), which is a fusion welding process used to join materials in various configurations. Laser beam welding systems typically include a laser light source, a laser light delivery system, an optical arrangement for delivering laser light to a work piece, and frequently a motion system for moving either the laser processing image or the work piece. LBW systems may include fiber-delivered beams or open beam paths, fixed optical systems, or galvanometer systems that allow for rapid deflection of the laser beam. Mechanical motion systems may include high-speed systems or low-speed systems depending on intended application. For the LBW process, laser light is focused using optical arrangements that include a collimation lens or mirror that stops the divergence of the laser light from the light source and delivers the light to a focusing lens or mirror. The focusing lens or mirror then directs the high-intensity, focused laser light to the work piece that is to be welded. The high-intensity laser light is then used to melt the material of the work pieces and fuse two or more parts or components together.

The use of laser processing systems, particularly LBW systems, in manufacturing has become common and such systems can be found in many manufacturing facilities worldwide. The functional success of all laser processing systems depends on predetermined, stable, and repeatable laser beam characteristics including focal spot shape, distribution, and location. Accordingly, there is an ongoing need for accurate, easy to use, and affordable systems, devices, and methods for analyzing the quality and dynamic accuracy of laser focal spots formed by laser processing systems having motion capability. Instruments are available to measure stationary laser focal spots and images, but these devices cannot measure moving focal spots, especially those that travel rapidly.

SUMMARY

The following provides a summary of certain example implementations of the disclosed technology. This summary is not an extensive overview and is not intended to identify key or critical aspects or elements of the disclosed technology or to delineate its scope. However, it is to be understood that the use of indefinite articles in the language used to describe and claim the disclosed technology is not intended in any way to limit the described technology. Rather the use of "a" or "an" should be interpreted to mean "at least one" or "one or more".

One implementation of the disclosed technology provides a system for analyzing laser beam characteristics in high-speed laser motion systems, wherein the high-speed laser motion systems comprise multiple lasers each having a field of view that generates non-stationary laser beams and a build platform positioned at a predetermined location relative to the non-stationary laser beams, comprising at least one mounted pin-hole sensor that receives laser light generated by the non-stationary laser beams; an actuation device that includes either the at least one pin-hole sensor; or an optical device that directs the laser light to the at least one pin-hole sensor; and wherein the actuation device is actuated into an operating environment above the build platform.

The actuation device can traverse the length of the field of view of each laser. The system may further comprise a fiber optic cable affixed to each pin-hole sensor, wherein each fiber optic cable has a proximal end at which the laser light is received through the pin-hole sensor, and a distal end to which the laser light is delivered. The system may further comprise a photodetector located at the distal end of each fiber optic cable, wherein the photodetector converts the laser light delivered to the photodetector into electrical voltage output signals based on intensity of the laser light received through the at least one pin-hole sensor. The at least one pin-hole sensor can be mounted on a recoater arm that can traverse the length of the field of view of each laser. The at least one pin-hole sensor measures shape, quality, and location of the non-stationary laser beams during in-build processing. The at least one pin-hole sensor can measure the shape, quality, and location of the non-stationary laser beams at any location within the field of view of each of the multiple lasers, wherein an overlapping region is formed between the field of view of each of the multiple lasers. The at least one pin-hole sensor can measure the shape, quality, and location of the non-stationary laser beams at a center point, an extremity, and in the overlapping regions of the field of view.

Another implementation of the disclosed technology provides a system for analyzing laser beam characteristics in high-speed laser motion systems, wherein the high-speed laser motion systems comprise multiple lasers each having a field of view that generates non-stationary laser beams and a build platform positioned at a predetermined location relative to the non-stationary laser beams, comprising at least one mounted pin-hole sensor that receives laser light generated by the non-stationary laser beams, wherein the at least one pin-hole sensor performs in-build analysis of the non-stationary laser beams; an actuation device that includes either the at least one pin-hole sensor; or an optical device that directs the laser light to the at least one pin-hole sensor;

and wherein the actuation device is actuated into an operating environment above the build platform.

The actuation device can traverse the length of the field of view of each laser. The system may further comprise a fiber optic cable affixed to each pin-hole sensor, wherein each fiber optic cable has a proximal end at which the laser light is received through the pin-hole sensor, and a distal end to which the laser light is delivered. The system may further comprise a photodetector located at the distal end of each fiber optic cable, wherein the photodetector converts the laser light delivered to the photodetector into electrical voltage output signals based on intensity of the laser light received through the at least one pin-hole sensor. The at least one pin-hole sensor can be mounted on a recoater arm that can traverse the length of the field of view of each laser. The at least one pin-hole sensor measures shape, quality, and location of the non-stationary laser beams at any location within the field of view of each of the multiple lasers, wherein an overlapping region is formed between the field of view of each of the multiple lasers. The at least one pin-hole sensor can measure the shape, quality, and location of the non-stationary laser beams at a center point, an extremity, and in the overlapping regions of the field of view.

Still another implementation of the disclosed technology provides a method for analyzing laser beam characteristics in high-speed laser motion systems, wherein the high-speed laser motion systems comprise multiple lasers each having a field of view that generates non-stationary laser beams and a build platform positioned at a predetermined location relative to the non-stationary laser beams, comprising mounting at least one pin-hole sensor that receives laser light generated by the non-stationary laser beams; actuating an actuation device into an operating environment above the build platform, wherein the actuation device includes either the at least one pin-hole sensor; or an optical device that directs the laser light to the at least one pin-hole sensor; and through the at least one pin-hole sensor, measuring shape, quality, and location of the non-stationary laser beams during in-build processing.

The method may further comprise affixing a fiber optic cable to each pin-hole sensor, wherein each fiber optic cable has a proximal end at which the laser light is received through the pin-hole sensor, and a distal end to which the laser light is delivered to a photodetector. The shape, quality, and location of the non-stationary laser beams is measured at any location within the field of view of each of the multiple lasers, wherein an overlapping region is formed between the field of view of each of the multiple lasers. The at least one pin-hole sensor can measure the shape, quality, and location of the non-stationary laser beams at a center point, an extremity, and in the overlapping regions of the field of view. The method may further comprise traversing the actuation device the length of the field of view of each laser.

It should be appreciated that all combinations of the foregoing concepts and additional concepts discussed in greater detail below (provided such concepts are not mutually inconsistent) are contemplated as being part of the technology disclosed herein and may be implemented to achieve the benefits as described herein. Additional features and aspects of the disclosed system, devices, and methods will become apparent to those of ordinary skill in the art upon reading and understanding the following detailed description of the example implementations. As will be appreciated by the skilled artisan, further implementations are possible without departing from the scope and spirit of what is disclosed herein. Accordingly, the descriptions provided herein are to be regarded as illustrative and not restrictive in nature.

BRIEF DESCRIPTION OF THE DRAWINGS

The accompanying drawings, which are incorporated into and form a part of the specification, schematically illustrate one or more example implementations of the disclosed technology and, together with the general description given above and detailed descriptions given below, serve to explain the principles of the disclosed subject matter, and wherein:

FIG. 7D is an illustration of an example testing apparatus being used to analyze the characteristics of a non-stationary laser beam being generated by a laser source present in a laser powder bed fusion system, wherein the laser beam is shown contacting the testing apparatus at a fourth position;

FIG. 7E is an illustration of an example testing apparatus being used to analyze the characteristics of a non-stationary laser beam being generated by a laser source present in a laser powder bed fusion system, wherein the laser beam is shown contacting the testing apparatus at a fifth position;

FIG. 7F is an illustration of an example testing apparatus being used to analyze the characteristics of a non-stationary laser beam being generated by a laser source present in a laser powder bed fusion system, wherein the laser beam is shown contacting the testing apparatus at a sixth position;

FIG. 14 is a cross-sectional view of the actuated device of FIG. 12 in a fully actuated position showing detail of the optical devices directing a laser beam to a pin-hole sensor.

DETAILED DESCRIPTION

Figure 1:
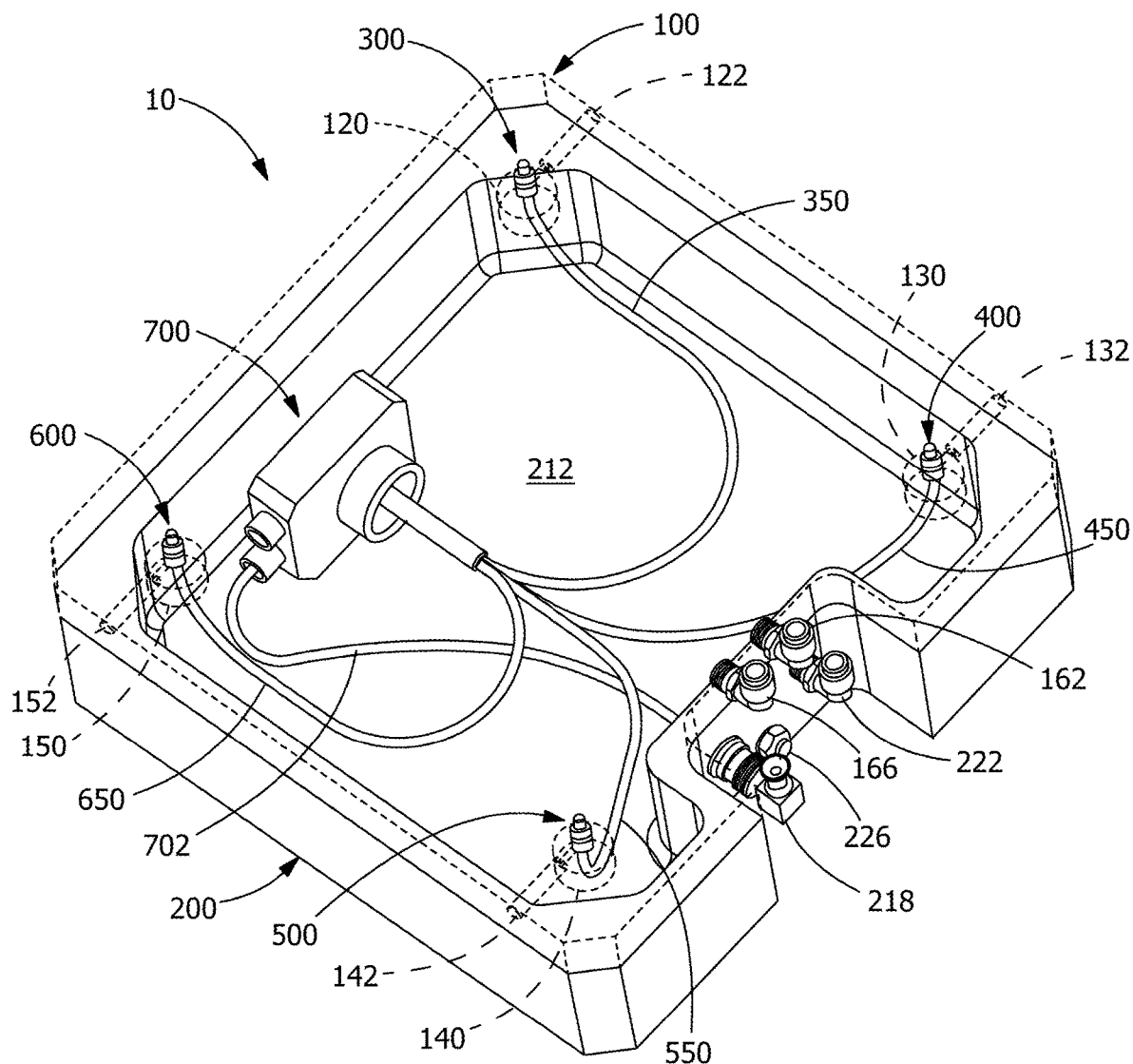
FIG. 1 is a perspective view of an example testing apparatus for use with laser powder bed fusion systems, wherein the calibration plate/support component is shown in broken lines.
Figure 2:
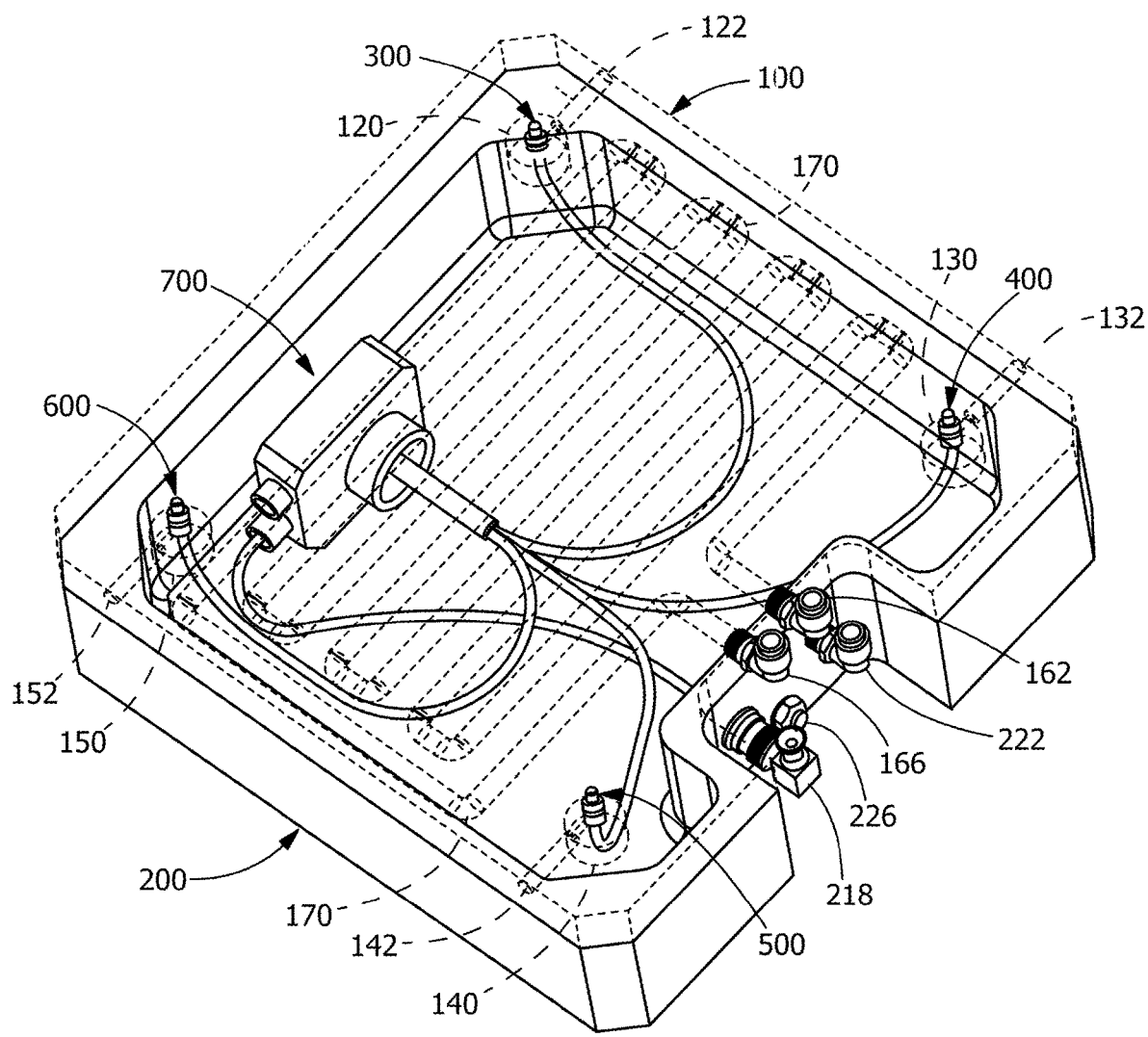
FIG. 2 is a perspective view of the testing apparatus of FIG. 1, wherein the calibration plate/support component and the cooling channels formed therein are shown in broken lines.
Figure 3:
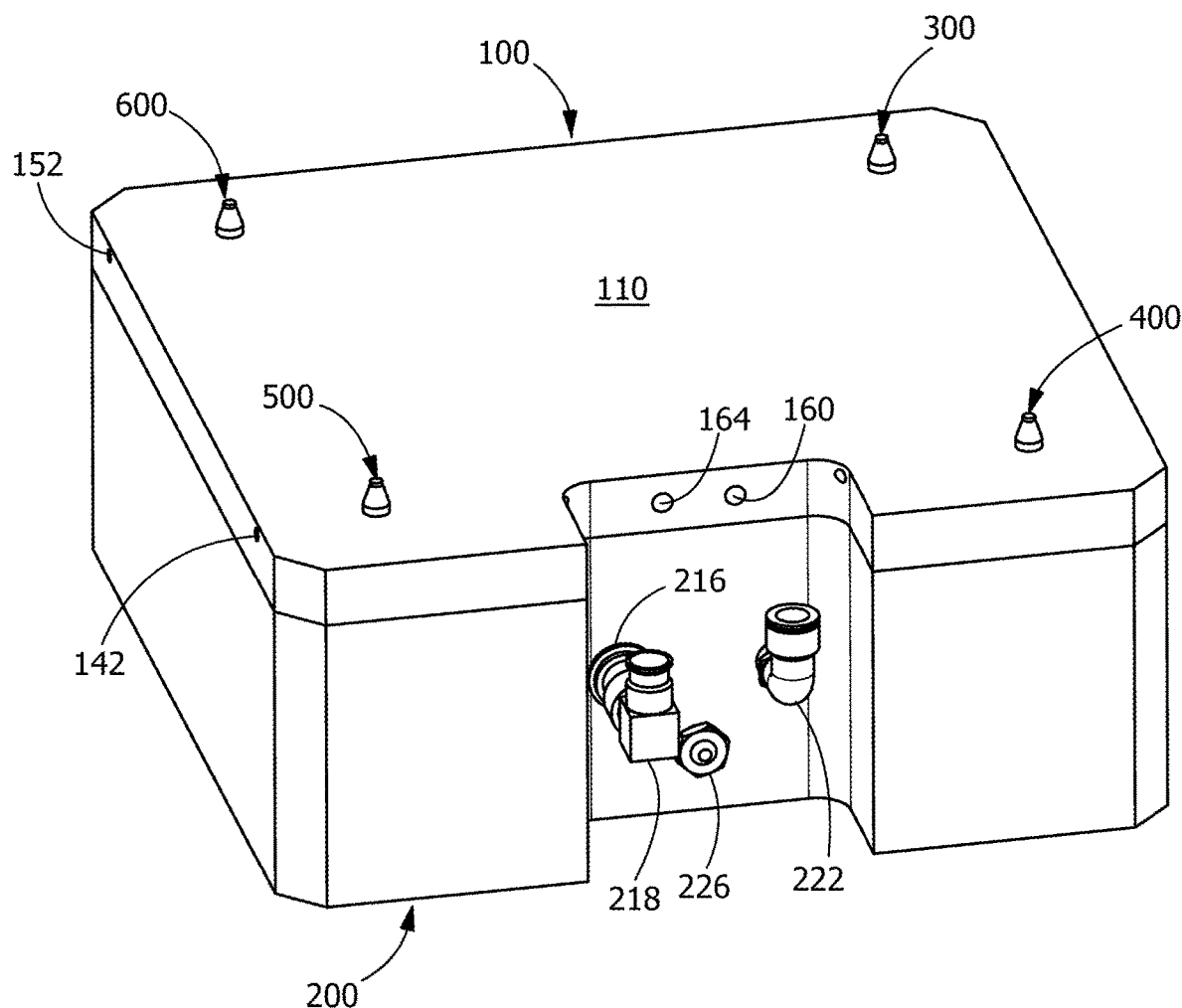
FIG. 3 is a perspective view of the testing apparatus of FIG. 1, wherein the calibration plate/support in which the pin-hole defining structures are mounted is shown in solid lines.
Figure 4:
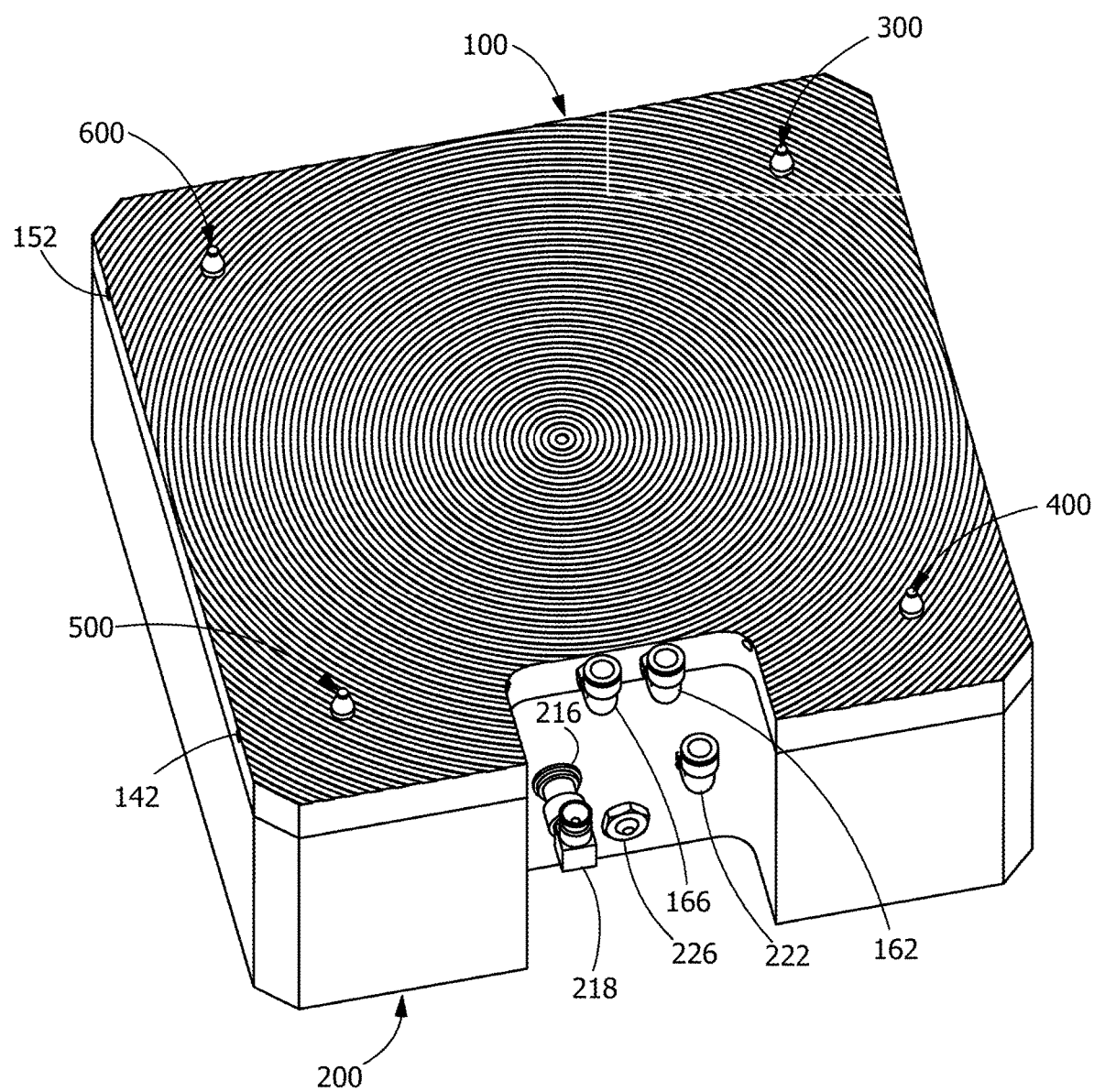
FIG. 4 is a perspective view of the testing apparatus of FIG. 1, wherein the upper surface of the calibration plate/support component includes a plurality of concentrically arranged ridges or raised portions for absorbing and distributing heat generated by a laser beam.
Figure 5C:
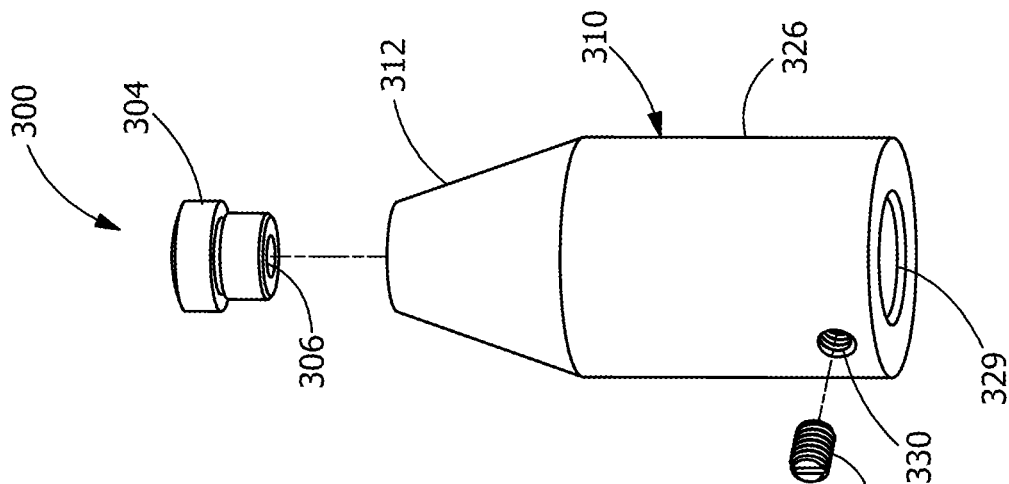
FIG. 5C is an exploded perspective view of the pin-hole defining structure (pedestal) of FIG. 5A.
Figure 5B:
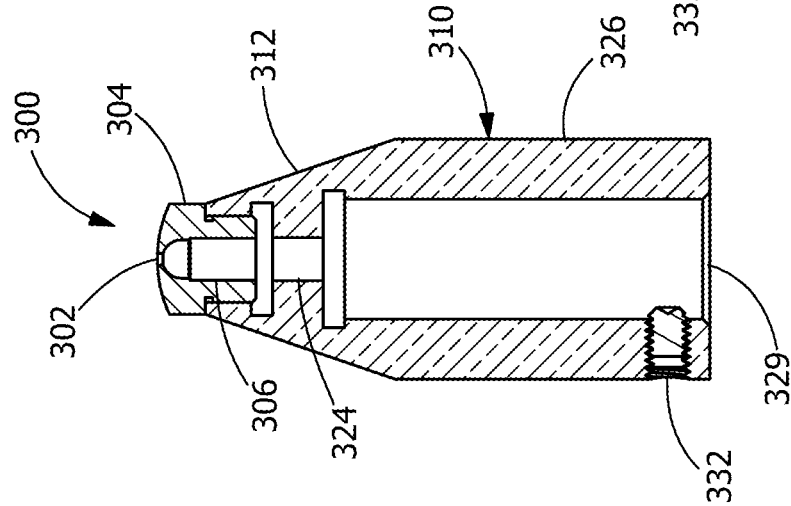
FIG. 5B is a cross-sectional view of the pin-hole defining structure (pedestal) of FIG. 5A.
Figure 5A:
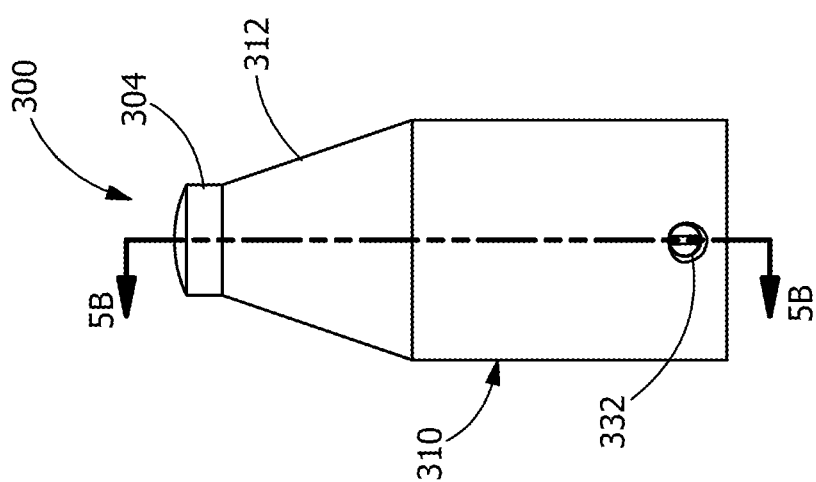
FIG. 5A is a front view of an example pin-hole defining structure (pedestal) shown in an assembled state.
Figure 6B:
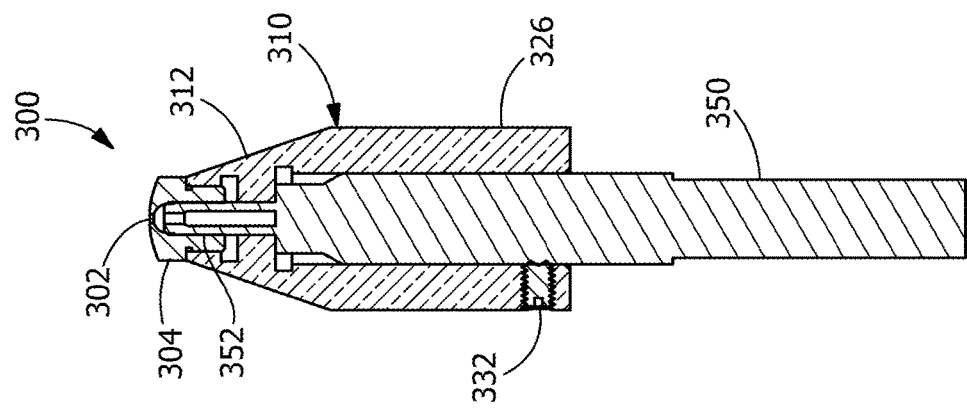
FIG. 6B is a cross-sectional view of the pin-hole defining structure (pedestal) and fiber optic cable assembly shown in FIG. 6A.
Figure 6A:
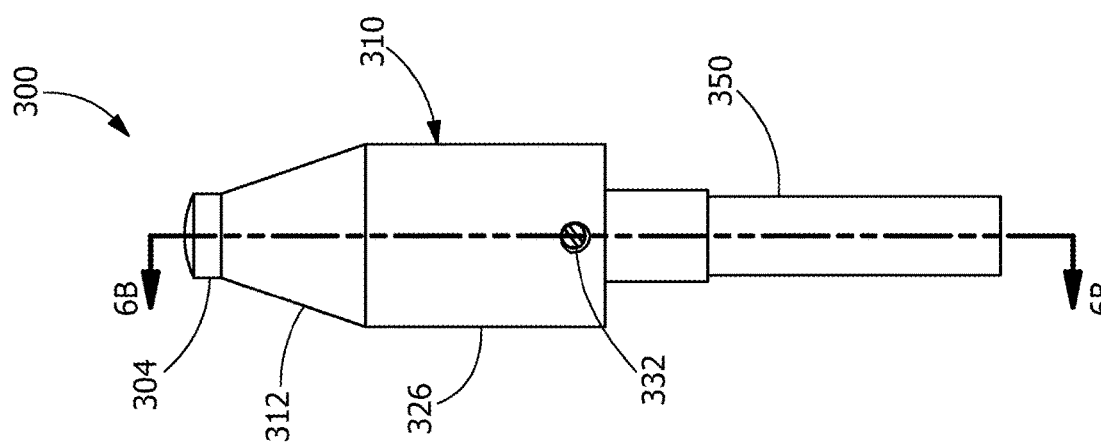
FIG. 6A is a front view of an example pin-hole defining structure (pedestal), wherein a fiber optic cable has been inserted into the pin-hole defining structure (pedestal)
Figure 7C:
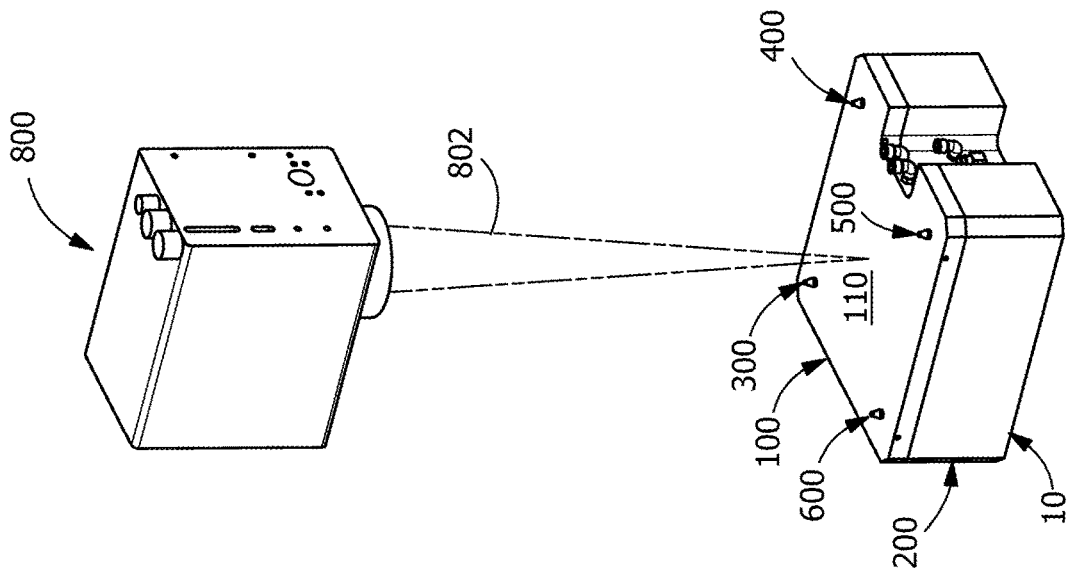
FIG. 7C is an illustration of an example testing apparatus being used to analyze the characteristics of a non-stationary laser beam being generated by a laser source present in a laser powder bed fusion system, wherein the laser beam is shown contacting the testing apparatus at a third position.
Figure 7B:
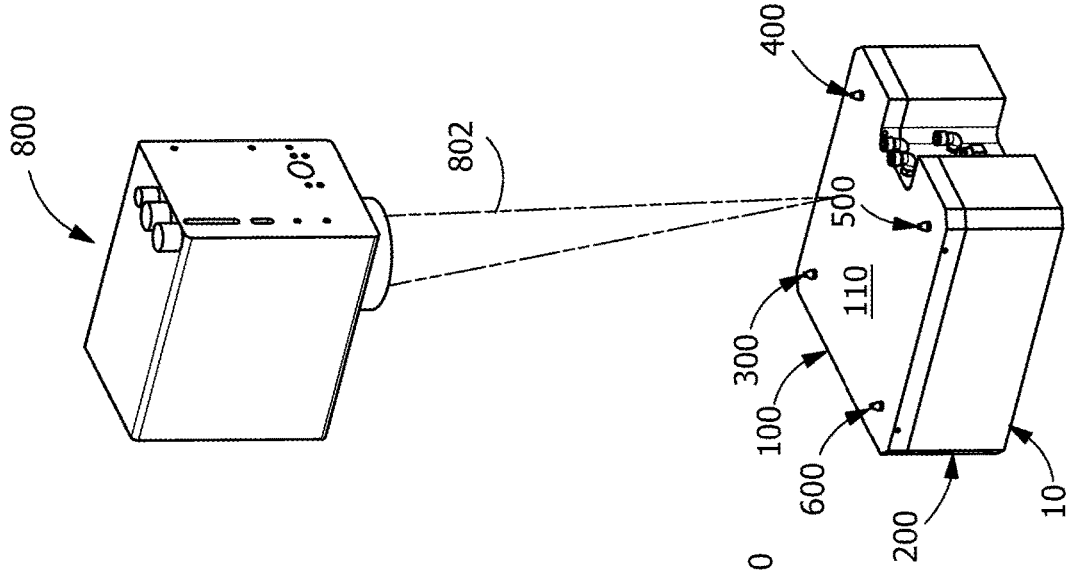
FIG. 7B is an illustration of an example testing apparatus being used to analyze the characteristics of a non-stationary laser beam being generated by a laser source present in a laser powder bed fusion system, wherein the laser beam is shown contacting the testing apparatus at a second position.
Figure 7A:
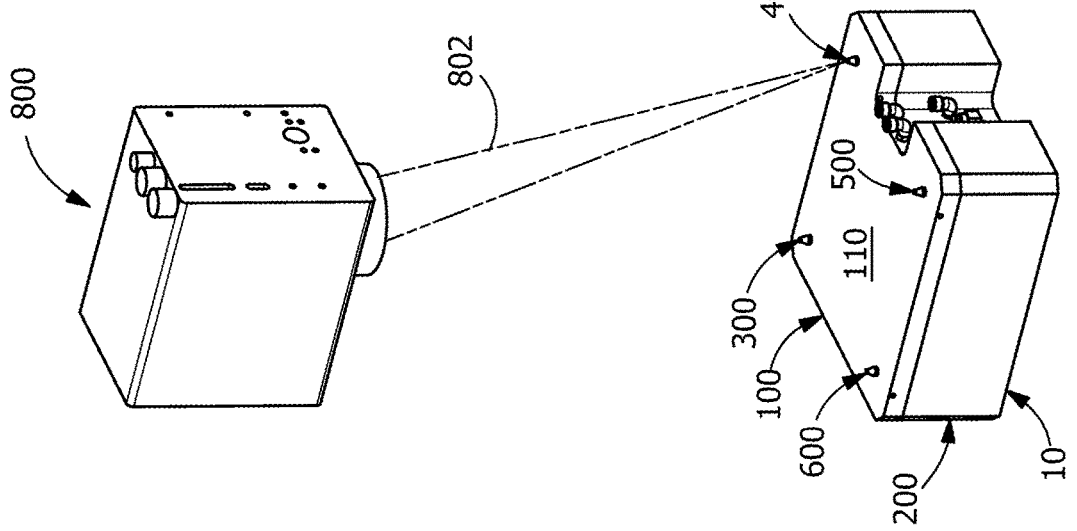
FIG. 7A is an illustration of an example testing apparatus being used to analyze the characteristics of a non-stationary laser beam being generated by a laser source present in a laser powder bed fusion system, wherein the laser beam is shown contacting the testing apparatus at a first position.

Example implementations are now described with reference to the Figures. Reference numerals are used throughout the detailed description to refer to the various elements and structures. Although the following detailed description contains many specifics for the purposes of illustration, a person of ordinary skill in the art will appreciate that many variations and alterations to the following details are within the scope of the disclosed technology. Accordingly, the following implementations are set forth without any loss of generality to, and without imposing limitations upon, the claimed subject matter.

The examples discussed herein are examples only and are provided to assist in the explanation of the apparatuses, devices, systems, and methods described herein. None of the features or components shown in the drawings or discussed below should be taken as required for any specific implementation of any of these the apparatuses, devices, systems or methods unless specifically designated as such. For ease of reading and clarity, certain components, modules, or methods may be described solely in connection with a specific Figure. Any failure to specifically describe a combination or sub-combination of components should not be understood as an indication that any combination or sub-combination is not possible. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

U.S. Pat. Nos. 10,976,219; and 10,627,311 are relevant to the disclosed technology and the entire contents of each of these patents is expressly incorporated by reference herein and are made part of this patent application for all purposes. These references disclose a system for use in additive manufacturing, for example, which is an industrial process that adds successive superfine layers of material to create three-dimensional objects. Each successive layer bonds or is fused to a preceding layer of melted or partially melted material and different substances for layering material, including metal powder, thermoplastics, ceramics, composites, glass, and other materials. Laser Powder Bed Fusion (L-PBF) is a specific process used in additive manufacturing wherein a three-dimensional component or part is built using a layer-by-layer approach that utilizes a high-power laser. L-PBF typically involves: (i) spreading a layer of powdered material (e.g., metal) over a build platform or plate; (ii) using a laser to fuse the first layer or first cross-section of a part; (iii) spreading a new layer of powder across the previous layer using a roller, recoater arm, coating blade, or similar device; (iv) using the laser to fuse the new layer or new cross-section of the part; (v) adding and fusing successive layers or cross sections; (vi) repeating the process until the entire part is created. Loose, unfused powdered material remains in position, but is removed during post processing.

The functional success of L-PBF systems depends on the existence of a known and stable laser focal spot on the powder bed work plane. The technology disclosed in U.S. Pat. Nos. 10,976,219; and 10,627,311 provides a portable testing apparatus for analyzing the quality and dynamic accuracy of laser focal spots in various L-PBF systems and devices. This testing apparatus is used with a laser powder bed fusion additive manufacturing device that further includes at least one laser that generates a non-stationary laser beam having known or predetermined characteristics and a build plane positioned at a predetermined location relative to the non-stationary laser beam, wherein the non-stationary laser beam translates (i.e., traverses) across the build plane in a controlled manner during additive manufacturing processes. The apparatus includes a support having an upper surface adapted to receive and absorb laser light generated by the non-stationary laser beam; a plurality of pin-hole defining structures each positioned to receive the laser light generated by the non-stationary laser beam, and such that each pin-hole is elevated at a predetermined height above the upper surface of the support and parallel thereto; a fiber optic cable disposed within each pin-hole defining structure, wherein each fiber optic cable has a proximal end at which the laser light is received through the pin-hole and a distal end to which the laser light is delivered; and a photodetector located at the distal end of each fiber optic cable, wherein the photodetector converts the laser light delivered to the photodetector into electrical voltage output signals based on intensity of the laser light received through each pin-hole. FIGS. 1-4, 5A-C, 6A-6B, 7A-F, and 8A-C provide various illustrative views of an example testing apparatus for analyzing the quality and dynamic accuracy of laser focal spots in various laser-based manufacturing systems including L-PBF systems and laser beam welding (LBW) systems.

As best shown in FIGS. 1-4, example testing apparatus 10 includes support 100; base 200; pin-hole defining structures or pin-hole sensors 300, 400, 500, and 600, which are mounted in support 100; and photodetector 700, which is located in base 200. Support 100, which is roughly square in shape, and which may be referred to as a calibration plate, includes an absorptive upper surface 110, which may further include a series of concentrically arranged ridges or other raised structures (see FIG. 4) that absorb and distribute heat generated by the laser beam for preventing damage to upper surface 110 and support 100. Support 100 further includes first mounting recess 120 (for receiving first pin-hole defining structure 300), first set screw aperture 122 (for receiving a set screw that secures first pin-hole defining structure 300 within first mounting recess 120), second mounting recess 130 (for receiving second pin-hole defining structure 400), second set screw aperture 132 (for receiving a set screw that secures second pin-hole defining structure 400 within second mounting recess 130), third mounting recess 140 (for receiving third pin-hole defining structure 500), third set screw aperture 142 (for receiving a set screw that secures third pin-hole defining structure 500 within third mounting recess 140, fourth mounting recess 150 (for receiving fourth pin-hole defining structure 600), and fourth set screw aperture 152 (for receiving a set screw that secures fourth pin-hole defining structure 600 within fourth mounting recess 150). Support 100 also includes first aperture 160 for receiving first coolant fitting 162, second aperture 164 for receiving second coolant fitting 166 and channels 170 for receiving and transporting liquid or gas coolant that transfers energy absorbed by support 100 away from testing apparatus 10.

Also, as best shown in FIGS. 1-4, base 200, the shape of which corresponds to the shape of support 100, cooperates with support 100 to form an enclosure. Base 200 includes outer wall 210 and inner cavity 212 in which photodetector 700 and the various fiber optic cables attached to the pin-hole defining structures are placed. Base 200 also includes aperture 214 for receiving Bayonet Neill-Concelman (BNC) bulkhead 216 to which BNC connector 218 is attached, second aperture 220 for receiving gas fitting 222, and third aperture 224 for receiving gas relief valve 226. In certain embodiments, a source of pressurized gas is connected to gas fitting 222 for delivering outwardly flowing gas to and through each pin-hole for preventing the contamination thereof by debris generated during the testing process or other debris.

With reference to FIGS. 1-4, 5A-C, and 6A-6B, the example embodiment of testing apparatus 10 shown in the Figures includes four pin-hole defining structures, which are also referred to as "pedestals". FIGS. 5A-C and 6A-6B illustrate only first pin-hole defining structure 300; however, the remaining pin-hole defining structures (400, 500, and 600) are constructed in the same manner as first pin-hole defining structure 300. Accordingly, FIGS. 5A-C and 6A-6B are meant to be representative of all of the pin-hole defining structures depicted in the Figures.

As shown in FIGS. 5A-C and 6A-6B, first pin-hole defining structure or pedestal 300 includes first pin-hole 302, which is formed in tip 304 through which channel 306 passes. The diameter of pin-hole 302 is typically one third to one-thirtieth the diameter of the laser beam being characterized by testing apparatus 10 (e.g., pinhole diameter: 5-50 µm). Tip 304 typically includes a highly reflective material such as gold, copper, or other reflective metal for minimizing damage to the pin-hole and pin-hole defining structure caused by absorption of energy from the laser beam. Tip 304 is mounted within body 310 which includes tapered portion 312 and cylindrical portion 326 through which channel 328 passes. First set screw aperture 330 is adapted to receive first set screw 332 which secures first fiber optic cable 350 in body 310. First optical fiber 352 is inserted into channel 306 and brought into close proximity with first pin-hole 302. First pin-hole defining structure or pedestal 300 is mounted within support 100 such that the pin-hole is elevated above upper surface 110 at a height (e.g. 20 to 40 mm) that minimizes any damage to the pin-hole and pedestal that may be caused by the energy of the non-stationary laser beam.

FIGS. 7A-7F are illustrations of testing apparatus 10 being used to analyze the characteristics of a non-stationary laser beam generated by a laser source present in a laser powder bed fusion system being used for additive manufacturing. In these Figures, laser source 800 generates laser beam 802, which contacts upper surface 110 of testing apparatus 10 at multiple positions or locations, including locations that include the previous discussed pin-holes. During the normal operation of testing apparatus 10, laser beam 802 is continually manipulated at typical operating power for bringing all the laser beam delivery elements of the laser powder bed fusion machine or system up to normal operating temperature and functionality such that any misalignment of laser beam 802 or loss of laser focus quality may be detected.

Figure 8A:
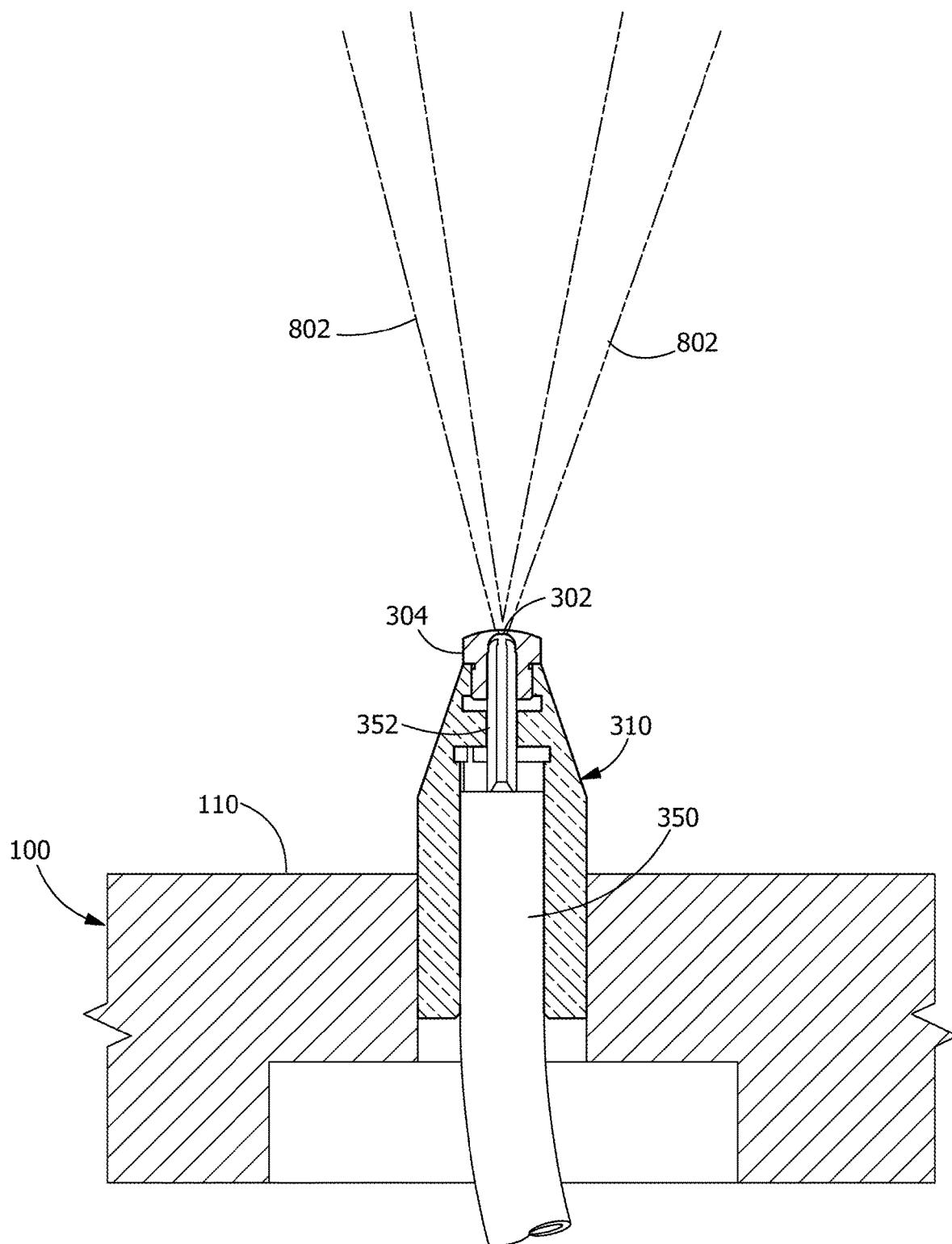
FIG. 8A is a cross-sectional view of an example pin-hole defining structure shown mounted in the calibration plate/support and receiving laser light from a laser beam being analyzed by the testing apparatus.
Figure 8B:
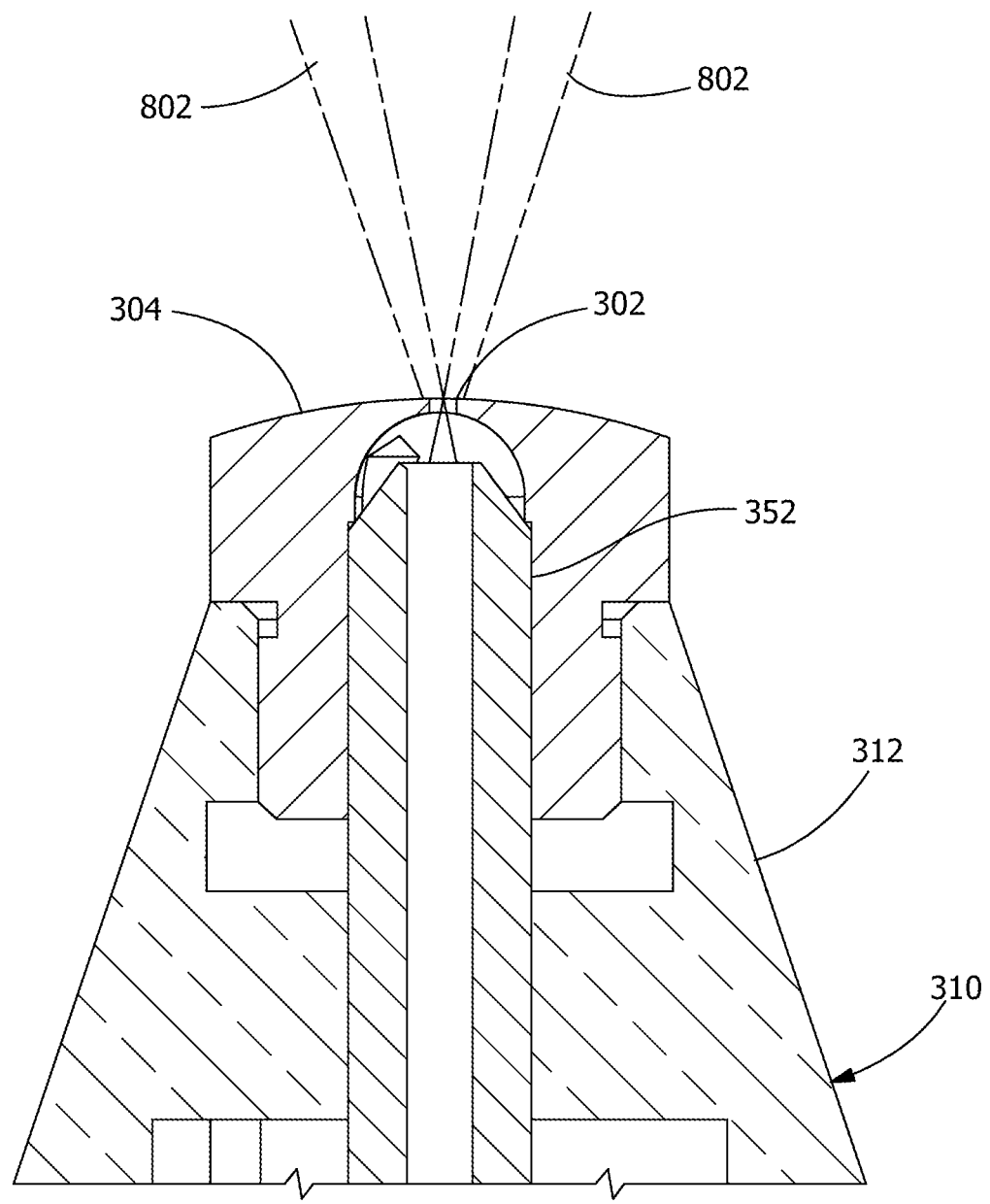
FIG. 8B is a detail of the upper portion of FIG. 8A showing a portion of the laser light passing through a pin-hole and the remaining laser light being reflected by the pin-hole defining structure.
Figure 8C:
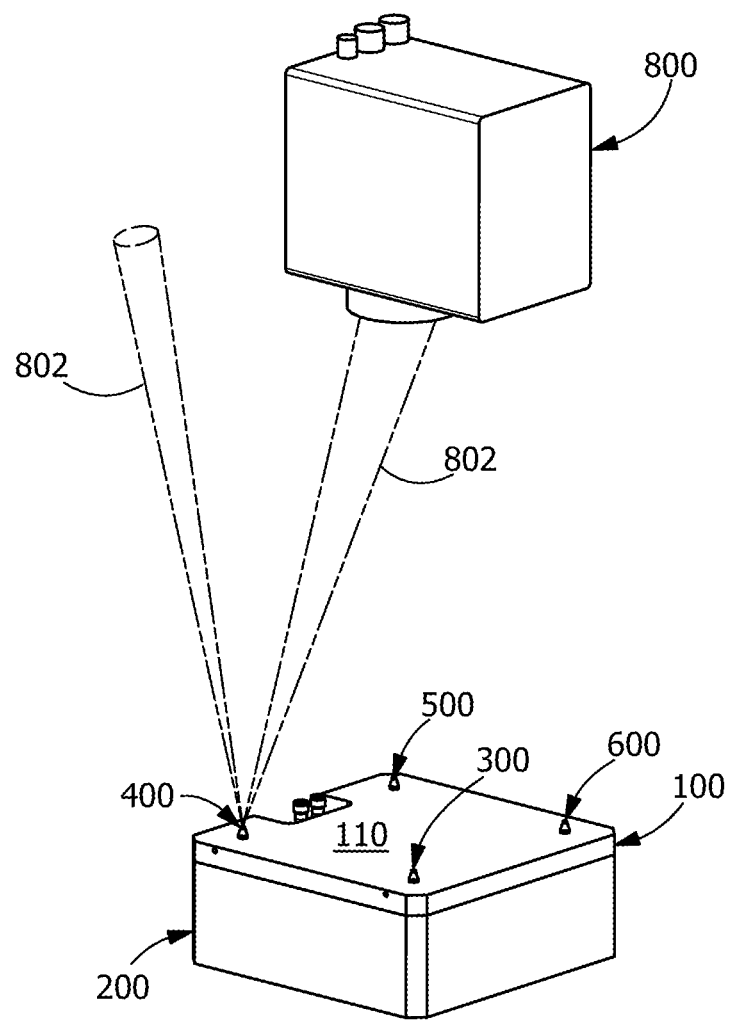
FIG. 8C is an illustration of an example testing apparatus being used to analyze the characteristics of a non-stationary laser beam being generated by a laser source present in a laser powder bed fusion system, wherein the laser beam is shown reflecting from one of the pin-hole defining structures.

FIG. 8A provides a cross-sectional view of pin-hole defining structure 300 shown mounted in support 100 and receiving laser light from laser beam 802 during normal operation of a laser powder bed fusion system being analyzed. FIG. 8B is a detail of the upper portion of FIG. 8A showing the laser light being reflected by pin-hole defining structure 300; and FIG. 8C provides an illustration of testing apparatus 10 being used to analyze the characteristics of non-stationary laser beam 802 being generated by laser source 800, wherein laser beam 802 is shown reflecting from pin-hole defining structure 400. In FIGS. 8A-8B, light from laser beam 802 is shown passing through pin-hole 302 and entering optical fiber 352 through which the signal is transmitted to photodetector 700 (see FIG. 1). The laser light than passes through pin-hole 302 is only a small amount of the laser light generated by laser beam 802. For example, for a laser beam having a total diameter of about 0.1 mm, the diameter of the portion of the beam that passes though pin-hole 302 would be about 0.025 mm. Laser light collected from each pin-hole may be transmitted to one or more light measuring devices through fiber optic coupling. Testing apparatus 10 includes a data acquisition device in communication with photodetector 700, wherein the data acquisition device receives, saves, organizes, and analyzes electrical signals as a function of time, or time and position, relative to the pin-holes through which the laser light was received. A data analysis algorithm associated with the data acquisition device calculates and determines laser beam quality based on data acquired from multiple passes of the non-stationary laser beam over the plurality of pin-holes. The data acquisition device may also include hardware and/or software (e.g., blue tooth or the like) that enables the transmission of data to a receiver located outside of an additive manufacturing device.

The systems, devices, and methods described above, and in U.S. Patent Publication No. 2021/0223140, which is also incorporated by reference herein in its entirety, are useful for analyzing many aspects of high-speed laser motion systems.

In one implementation, the disclosed technology is used in a method for analyzing a multi-laser system. Laser powder bead fusion machine operators and remote laser welding system operators with multiple lasers operating in a single work area often must coordinate laser systems. This is accomplished by analyzing laser beam quality and position for each laser included in a system. For these systems, it is important that each laser focal spot motion system produce a laser focal spot that is as similar as possible to other laser focal spots included in the system and that any differences between the laser beam focal spot are recognized and understood. Positional accuracy and calibration of high-speed laser beam motion systems are also important in areas where the field of view (i.e., work areas) overlap. In these areas, both high-speed laser motion systems need to process the parts without discontinuities. The ability to test the high-speed laser focal spot motion system during preproduction and post production are important, and is achievable with the disclosed technology. However, this method also allows for layer-by-layer or section-by-section in-build analysis of the system, and registering laser performance based on a particular layer of the build for laser powder bed fusion (LPBF), or particular area of the weld for remote laser welding.

The disclosed technology utilizes a pinhole laser beam analyzer similar to that described above for rapidly traveling laser beam quality monitoring and multiple laser beam location registration for high-speed laser motion systems. The disclosed technology is also used to analyze the shape, quality, and location of the laser beam, and more importantly, to analyze the beam in the overlap regions of the high speed motion system field of view. As described below, example implementations utilize alternative configurations of the pin-hole system to temporarily move into position the device for sampling the beam. The disclosed pinhole analyzers may be configured as part of an operating system for providing automated laser analysis. Alternately, an optical element that redirects laser light to a pinhole analyzer located elsewhere may be including in an operated system for providing automated laser analysis.

With reference to FIGS. 9A-9B and 10-11, an example implementation of the disclosed technology includes a sensor affixed to an actuation device. One or more pinhole sensors are affixed to an actuated device that locates the sensor in a single desired location of the high-speed motion system field of view. This location can be in the overlapping regions of a multi-laser system for analysis of the quality of each laser processing spot or image and registration of the location for each system. The location can also be anywhere in the field of view of a single system, in a single laser system, or multi-laser system. Other possible locations include near the center and/or near the extremities of the field of view. A pinhole sensor can also be affixed to a moving actuated device re-coater arm system capable of traversing the sensor the length of the high-speed motion system field of view. Alternately, one or more pin hole sensors can be affixed to a moving actuated device separate from the re-coater arm system capable of traversing the sensor the length of a high-speed motion system field of view, thereby isolating the sensor from any vibrations or positional inaccuracies induced by the re-coater arm. In both cases, the sensors can be actuated both in and out of the field of view.

Figure 12:
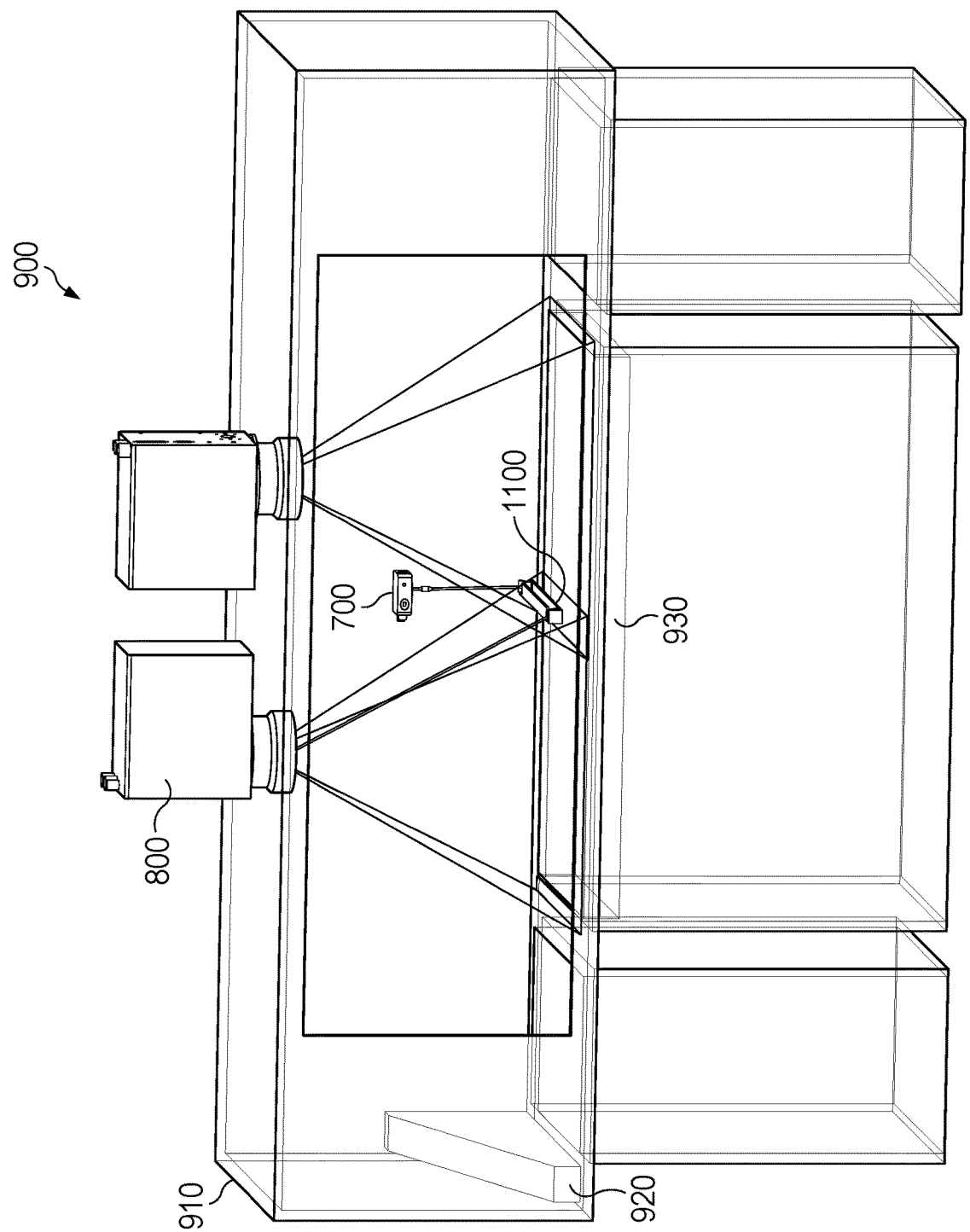
FIG. 12 depicts an example implementation of the disclosed system, wherein optical devices are affixed to an actuation device.
Figure 13:
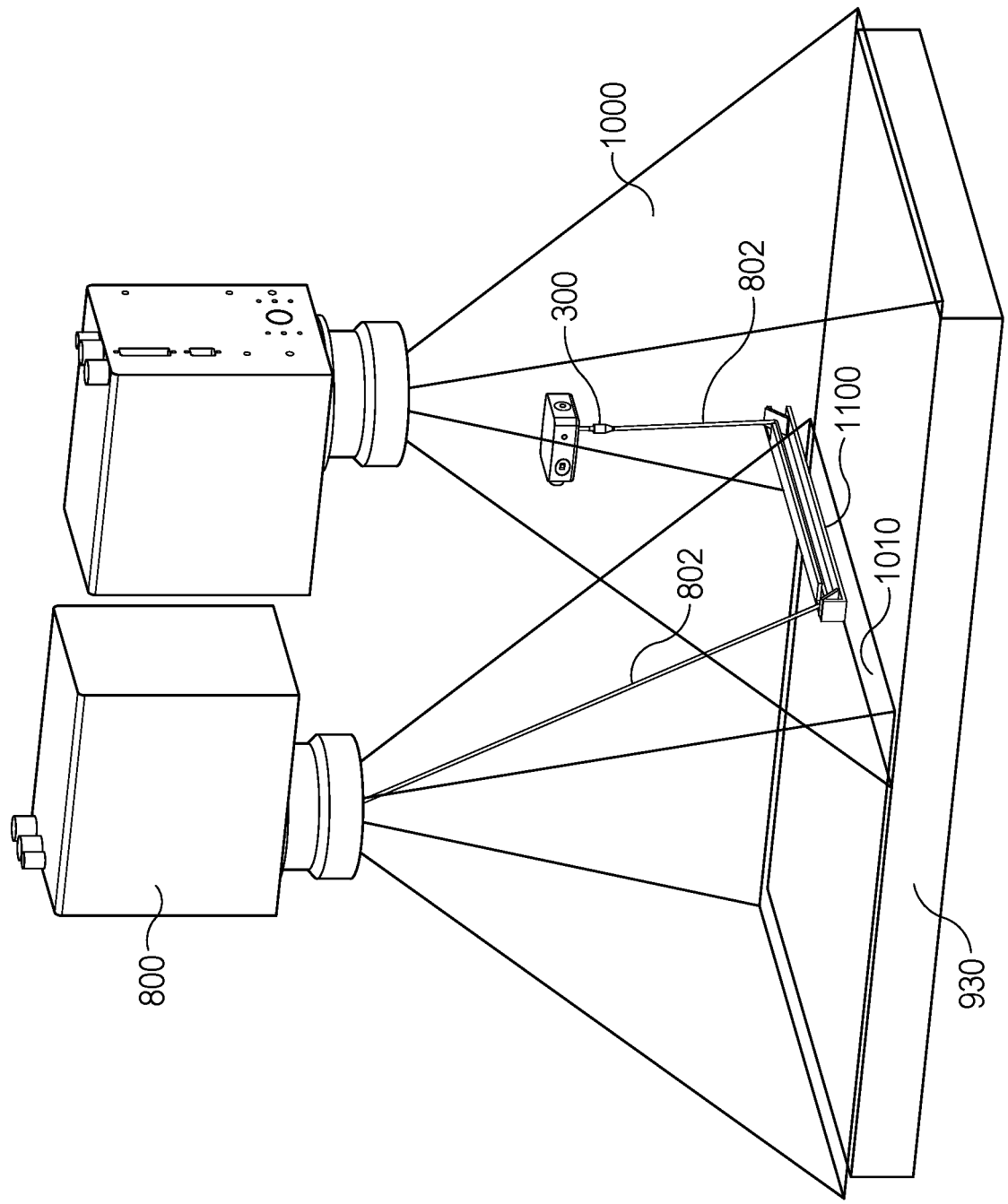
FIG. 13 depicts a detail view of the actuation device of FIG. 12 in a fully actuated position, wherein optical devices are affixed to the actuation device.

With reference to FIGS. 12-14, another example implementation of the disclosed technology includes a mirror or prism affixed to an actuation device. One or more optical devices (e.g., mirrors, partial reflection mirrors, beam splitters or prisms) are affixed to an actuated device capable of locating the optical device in a single a desired location in the field of view of a high-speed motion system. The optical device directs samplings of the laser beam to a pinhole located away from areas that could result in damage to the device. The optical device can be located in the overlap regions of a multi-laser system for analysis of quality of each laser and registration of the location of each system. The optical device may also be located anywhere in the field of view of a single system, in a single laser system, or multi-laser system. Possible locations include near the center and/or near the extremities of the field of view.

Key advantages and aspects of the disclosed technology include: (i) described configurations provide the ability to perform in process evaluation/confirmations of the laser beam and motion systems; (ii) the sweeping motion systems enable the pinhole sensors to sample the beam in multiple locations access the system field of view; (iii) one or more pinhole sensors connected to fiber optics can be used to transport the beam to a measurement device; (iv) mirrors and optical elements can be used to transport the beam through an open beam path to a pinhole sensor for sampling; (v) configuration (b) allows the pinhole sensor to be located in a safe location, thereby extending system life; and (vi) easily replicable consumables can be used in the field of view. Prior art systems including Primes Scan Field Monitor and Ophir Beam Watch AM are limited in sampling capability and location. These systems have limited capability to sample the beam in motion, as it would be and these systems have no current capability to sample the entire field of view during production. Numerous business entities are original equipment manufacturers, users, customizers, and analyzers of laser processing systems, including laser powder bed fusion systems and remote laser welding systems. Commercially available analytical systems are not sufficient for analyzing laser processing systems due to design limitations that require stationary beams and because large analytical systems limit the field of view areas that can be analyzed. Additionally, industry standards such as AMS 7003 create demand for a system such as the disclosed technology, which does not suffer from the design limitations of existing systems.

Figure 9A:
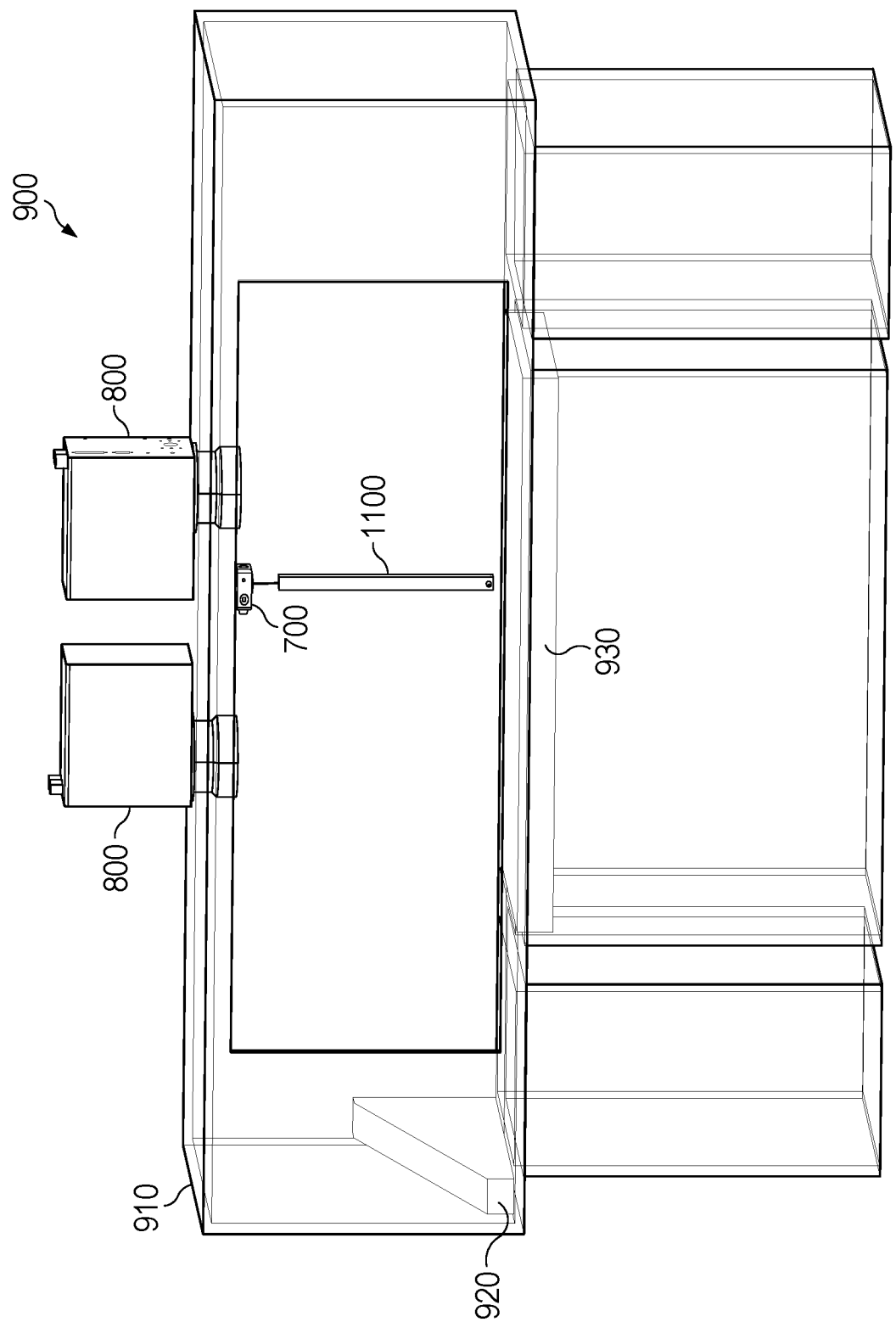
FIG. 9A depicts an example implementation of the disclosed system, wherein an actuation device is in a non-actuated position.
Figure 9B:
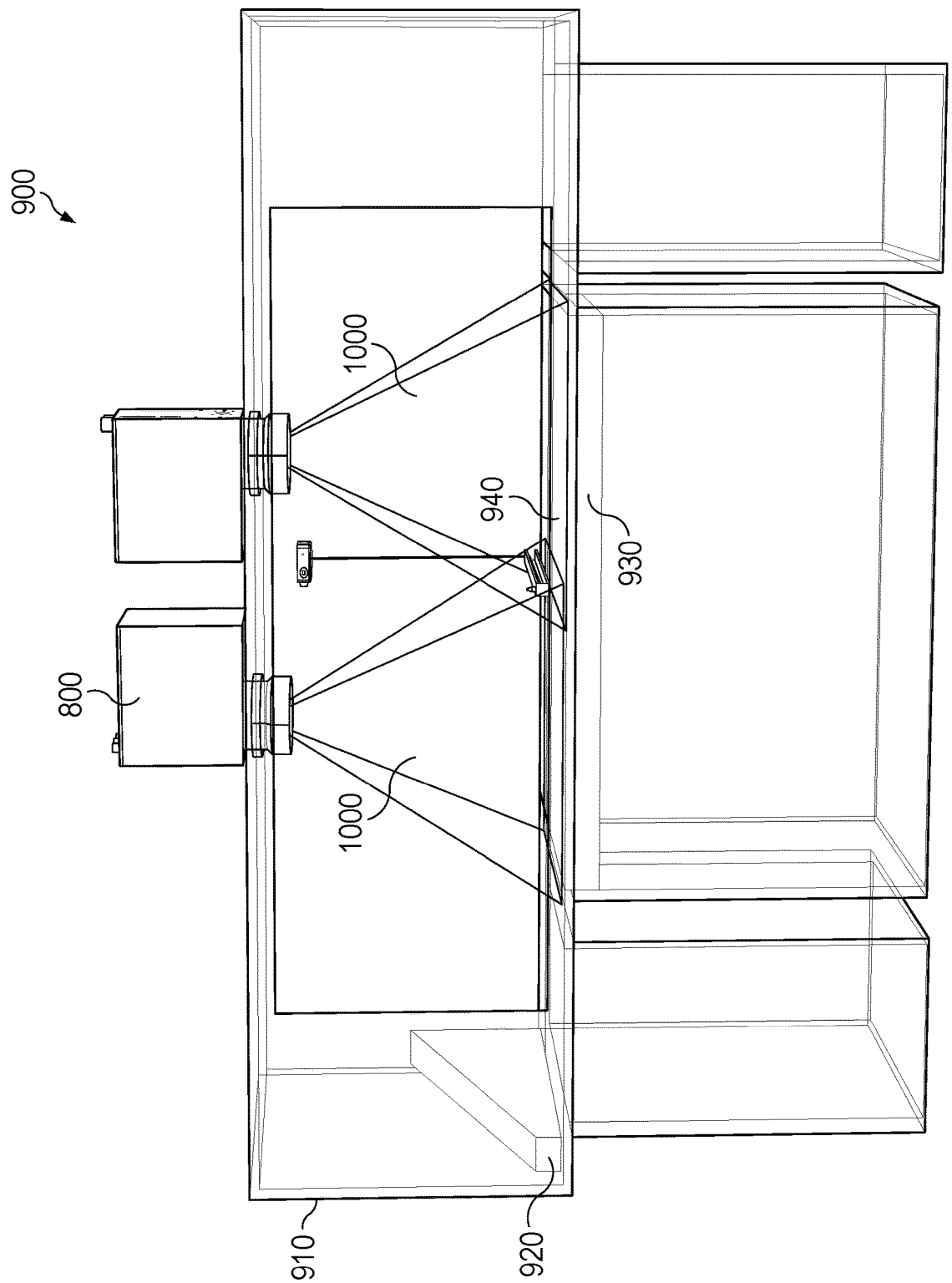
FIG. 9B depicts the actuation device of FIG. 9A in a fully actuated position within one example implementation of the disclosed system.
Figure 10:
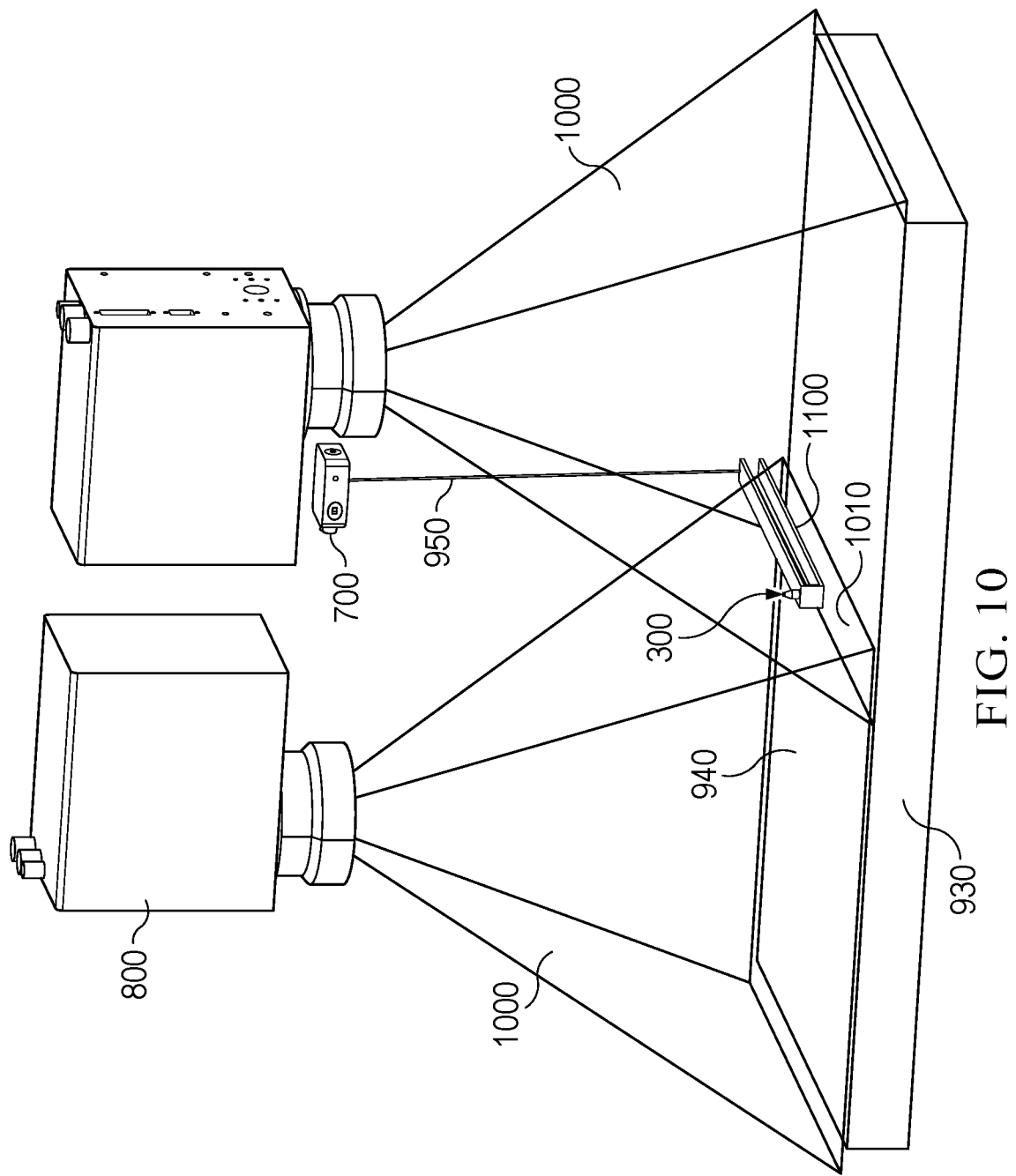
FIG. 10 depicts the actuation device of FIG. 9A in a fully actuated position, wherein a pin-hole sensor is affixed to the actuation device.

With reference to FIGS. 9A-9B and 10, an example implementation of laser system 900 includes enclosure 910, recoater arm 920, build platform 930, actuation device 1100 with pin-hole sensor 300, and photodetector 700. In these Figures, actuation device 1100 is actuated from a non-actuated position (shown in FIG. 9A) to an actuated position into operating environment 940 and above build platform 930 (shown in FIG. 9B). In this example implementation, actuation device 1100 is actuated into operating environment 940 by moving in a 90° angle from the non-actuated position. In another example implementation, actuation device 1100 is actuated into operating environment 940 through extension and retraction movements.

Figure 11:
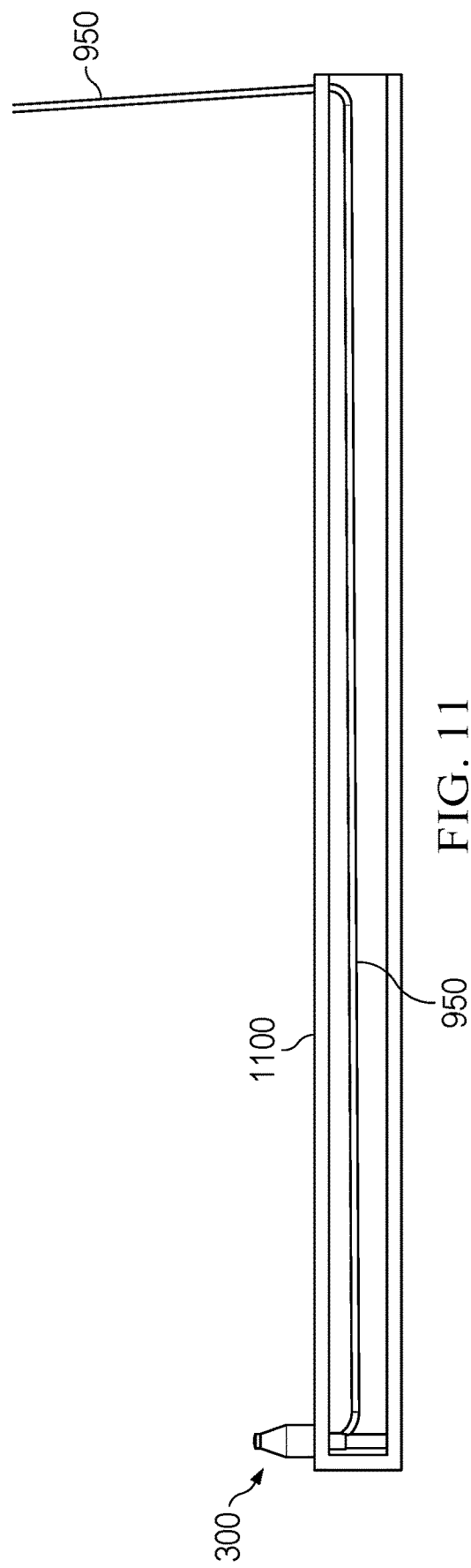
FIG. 11 is a cross-sectional view of the actuated device of FIG. 9A in a fully actuated position showing detail of the pin-hole sensor and a fiber optic cable disposed within the actuated device.

With reference to FIGS. 10-11, laser system 900 further includes multiple laser sources or lasers 800 each having field of view 1000, wherein lasers 800 generate non-stationary laser beams 802. As shown in FIG. 10, field of view 1000 from each laser 800 creates overlapping region 1010 at the intersection points of each field of view 1000. In one implementation of the disclosed technology, actuation device 1100 is actuated into operating environment 940 such that pin-hole sensor 300 is positionable in overlapping region 1010. In another implementation of the disclosed technology, actuation device 1100 can traverse the length of build platform 930 such that pin-hole sensor 300 is positionable at any location within each field of view 1000, including center points and extremities in field of view 1000. In yet another example implementation, pin-hole sensor 300 can be mounted on recoater arm 920 or other components within high-speed laser motion systems.

Further referring to FIGS. 10-11, pin-hole sensor 300 is affixed or mounted to actuation device 1100 to measure laser beam characteristics during in-build processing. Pin-hole sensor 300 receives laser light from non-stationary laser beam 802 and transmits the laser light through fiber optic cable 950 to photodetector 700. In this example implementation, fiber optic cable 950 is disposed within actuation device 1100, wherein pin-sensor 300 affixes to a proximal end of fiber optic cable 950 and photodetector 700 affixes to a distal end of fiber optic cable 950. Photodetector 700 converts the laser light delivered to photodetector 700 into electrical voltage output signals based on the intensity of the laser light received through pin-hole sensor 300.

With reference to FIGS. 12-14, another example implementation of laser system 900 includes enclosure 910, recoater arm 920, build platform 930, actuation device 1100 with optical devices 1400, 1500, and photodetector 700. In this implementation, laser system 900 functions the same as laser system 900 described and depicted in FIGS. 9A-9B and 10-11, the difference being laser system 900 in this implementation includes actuation device 1100 with optical devices 1400, 1500. Actuation device 1100 with optical devices 1400, 1500 is actuated from a non-actuated position to an actuated position into operating environment 940 and above build platform 930 (shown in FIG. 12). Actuation device 1100 with optical devices 1400, 1500 can be actuated into operating environment 940 by moving in a 90° angle from the non-actuated position or through extension and retraction movements. In one implementation of the disclosed technology, actuation device 1100 is actuated into operating environment 940 such that optical devices 1400, 1500 are positionable in overlapping region 1010. In another implementation of the disclosed technology, actuation device 1100 can traverse the length of build platform 930 such optical devices 1400, 1500 are positionable at any location within each field of view 1000 from lasers 800, including center points and extremities in field of view 1000.

Now referring to FIGS. 13-14, optical devices 1400, 1500 are affixed or mounted to actuation device 1100. In this implementation, optical device 1400 receives laser light from non-stationary laser beam 802 and directs the laser light from non-stationary laser beam 802 to optical device 1500. Optical device 1500 then directs the laser light from non-stationary laser beam 802 to pin-hole sensor 300. In this implementation, pin-hole sensor 300 is not affixed to actuation device 1100. Pin-hole sensor 300 receives the directed laser light from non-stationary laser beam 802 and transmits the laser light through fiber optic cable 950 to photodetector 700.

All literature and similar material cited in this application, including, but not limited to, patents, patent applications, articles, books, treatises, and web pages, regardless of the format of such literature and similar materials, are expressly incorporated by reference in their entirety. Should one or more of the incorporated references and similar materials differs from or contradicts this application, including but not limited to defined terms, term usage, described techniques, or the like, this application controls.

As previously stated and as used herein, the singular forms "a," "an," and "the," refer to both the singular as well as plural, unless the context clearly indicates otherwise. The term "comprising" as used herein is synonymous with "including," "containing," or "characterized by," and is inclusive or open-ended and does not exclude additional, unrecited elements or method steps. Although many methods and materials similar or equivalent to those described herein can be used, particular suitable methods and materials are described herein. Unless context indicates otherwise, the recitations of numerical ranges by endpoints include all numbers subsumed within that range. Furthermore, references to "one implementation" are not intended to be interpreted as excluding the existence of additional implementations that also incorporate the recited features. Moreover, unless explicitly stated to the contrary, implementations "comprising" or "having" an element or a plurality of elements having a particular property may include additional elements whether or not they have that property.

The terms "substantially" and "about", if or when used throughout this specification describe and account for small fluctuations, such as due to variations in processing. For example, these terms can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%, and/or 0%.

Underlined and/or italicized headings and subheadings are used for convenience only, do not limit the disclosed subject matter, and are not referred to in connection with the interpretation of the description of the disclosed subject matter. All structural and functional equivalents to the elements of the various implementations described throughout this disclosure that are known or later come to be known to those of ordinary skill in the art are expressly incorporated herein by reference and intended to be encompassed by the disclosed subject matter. Moreover, nothing disclosed herein is intended to be dedicated to the public regardless of whether such disclosure is explicitly recited in the above description.

There may be many alternate ways to implement the disclosed technology. Various functions and elements described herein may be partitioned differently from those shown without departing from the scope of the disclosed technology. Generic principles defined herein may be applied to other implementations. Different numbers of a given module or unit may be employed, a different type or types of a given module or unit may be employed, a given module or unit may be added, or a given module or unit may be omitted.

Regarding this disclosure, the term "a plurality of" refers to two or more than two. Unless otherwise clearly defined, orientation or positional relations indicated by terms such as "upper" and "lower" are based on the orientation or positional relations as shown in the figures, only for facilitating description of the disclosed technology and simplifying the description, rather than indicating or implying that the referred devices or elements must be in a particular orientation or constructed or operated in the particular orientation, and therefore they should not be construed as limiting the disclosed technology. The terms "connected", "mounted", "fixed", etc. should be understood in a broad sense. For example, "connected" may be a fixed connection, a detachable connection, or an integral connection; a direct connection, or an indirect connection through an intermediate medium. For an ordinary skilled in the art, the specific meaning of the above terms in the disclosed technology may be understood according to specific circumstances.

Specific details are given in the above description to provide a thorough understanding of the disclosed technology. However, it is understood that the disclosed embodiments and implementations can be practiced without these specific details. For example, circuits can be shown in block diagrams in order not to obscure the disclosed implementations in unnecessary detail. In other instances, well-known circuits, processes, algorithms, structures, and techniques can be shown without unnecessary detail in order to avoid obscuring the disclosed implementations.

Implementation of the techniques, blocks, steps and means described above can be accomplished in various ways. For example, these techniques, blocks, steps and means can be implemented in hardware, software, or a combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

The disclosed technology can be described as a process which is depicted as a flowchart, a flow diagram, a data flow diagram, a structure diagram, or a block diagram. Although a flowchart can describe the operations as a sequential process, many of the operations can be performed in parallel or concurrently. In addition, the order of the operations can be re-arranged. A process is terminated when its operations are completed, but could have additional steps not included in the figure. A process can correspond to a method, a function, a procedure, a subroutine, a subprogram, etc. When a process corresponds to a function, its termination corresponds to a return of the function to the calling function or the main function.

Furthermore, the disclosed technology can be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks can be stored in a machine readable medium such as a storage medium. A code segment or machine-executable instruction can represent a procedure, a function, a subprogram, a program, a routine, a subroutine, a module, a software package, a script, a class, or any combination of instructions, data structures, and/or program statements. A code segment can be coupled to another code segment or a hardware circuit by passing and/or receiving information, data, arguments, parameters, and/or memory contents. Information, arguments, parameters, data, etc. can be passed, forwarded, or transmitted via any suitable means including memory sharing, message passing, ticket passing, network transmission, etc.

It should be appreciated that all combinations of the foregoing concepts and additional concepts discussed in greater detail herein (provided such concepts are not mutually inconsistent) are contemplated as being part of the disclosed technology. In particular, all combinations of claimed subject matter appearing at the end of this disclosure are contemplated as being part of the technology disclosed herein. While the disclosed technology has been illustrated by the description of example implementations, and while the example implementations have been described in certain detail, there is no intention to restrict or in any way limit the scope of the appended claims to such detail. Additional advantages and modifications will readily appear to those skilled in the art. Therefore, the disclosed technology in its broader aspects is not limited to any of the specific details, representative devices and methods, and/or illustrative examples shown and described. Accordingly, departures may be made from such details without departing from the spirit or scope of the general inventive concept.

What is claimed:

1. A system for analyzing laser beam characteristics in high-speed laser motion systems, wherein the high-speed laser motion systems comprise multiple lasers each having a field of view that generates non-stationary laser beams and a build platform positioned at a predetermined location relative to the non-stationary laser beams, comprising:
   (a) at least one mounted pin-hole sensor that receives laser light generated by the non-stationary laser beams;
   (b) an actuation device that includes either:
      (i) the at least one pin-hole sensor; or
      (ii) an optical device that directs the laser light to the at least one pin-hole sensor; and
   wherein the actuation device is actuated into an operating environment above the build platform, wherein the actuation device is substantially parallel with the build platform when actuated into the operating environment, and wherein the actuation device is substantially perpendicular to the build platform when actuated out of the operating environment.

2. The system of claim 1, wherein the actuation device can traverse the length of the field of view of each laser.

3. The system of claim 1, wherein the system further comprises a fiber optic cable affixed to each pin-hole sensor, wherein each fiber optic cable has a proximal end at which the laser light is received through the pin-hole sensor, and a distal end to which the laser light is delivered.

4. The system of claim 3, wherein the system further comprises a photodetector located at the distal end of each fiber optic cable, wherein the photodetector converts the laser light delivered to the photodetector into electrical voltage output signals based on intensity of the laser light received through the at least one pin-hole sensor.

5. The system of claim 1, wherein the at least one pin-hole sensor can be mounted on a recoater arm that can traverse the length of the field of view of each laser.

6. The system of claim 1, wherein the at least one pin-hole sensor measures shape, quality, and location of the non-stationary laser beams during in-build processing.

7. The system of claim 6, wherein the at least one pin-hole sensor can measure the shape, quality, and location of the non-stationary laser beams at any location within the field of view of each of the multiple lasers, wherein an overlapping region is formed between the field of view of each of the multiple lasers.

8. The system of claim 7, wherein the at least one pin-hole sensor can measure the shape, quality, and location of the non-stationary laser beams at a center point, an extremity, and in the overlapping regions of the field of view.

9. A system for analyzing laser beam characteristics in high-speed laser motion systems, wherein the high-speed laser motion systems comprise multiple lasers each having a field of view that generates non-stationary laser beams and a build platform positioned at a predetermined location relative to the non-stationary laser beams, comprising:
   (a) at least one mounted pin-hole sensor that receives laser light generated by the non-stationary laser beams, wherein the at least one pin-hole sensor performs in-build analysis of the non-stationary laser beams;
   (b) an actuation device that includes:
      (i) a first optical device and a second optical device, wherein the first optical device directs the laser light to the second optical device, and wherein the second optical device redirects the laser light to the at least one pin-hole sensor; and wherein the actuation device is actuated into an operating environment above the build platform.

10. The system of claim 9, wherein the actuation device can traverse the length of the field of view of each laser.

11. The system of claim 9, wherein the system further comprises a fiber optic cable affixed to each pin-hole sensor, wherein each fiber optic cable has a proximal end at which the laser light is received through the pin-hole sensor, and a distal end to which the laser light is delivered.

12. The system of claim 11, wherein the system further comprises a photodetector located at the distal end of each fiber optic cable, wherein the photodetector converts the laser light delivered to the photodetector into electrical voltage output signals based on intensity of the laser light received through the at least one pin-hole sensor.

13. The system of claim 9, wherein the at least one pin-hole sensor can be mounted on a recoater arm that can traverse the length of the field of view of each laser.

14. The system of claim 9, wherein the at least one pin-hole sensor measures shape, quality, and location of the non-stationary laser beams at any location within the field of view of each of the multiple lasers, wherein an overlapping region is formed between the field of view of each of the multiple lasers.

15. The system of claim 14, wherein the at least one pin-hole sensor can measure the shape, quality, and location of the non-stationary laser beams at a center point, an extremity, and in the overlapping regions of the field of view.

16. A method for analyzing laser beam characteristics in high-speed laser motion systems, wherein the high-speed laser motion systems comprise multiple lasers each having a field of view that generates non-stationary laser beams and a build platform positioned at a predetermined location relative to the non-stationary laser beams, comprising:
(a) mounting at least one pin-hole sensor that receives laser light generated by the non-stationary laser beams;
(b) actuating an actuation device into an operating environment above the build platform, wherein the actuation device includes:
(i) a first optical device and a second optical device, wherein the first optical device directs the laser light to the second optical device, and wherein the second optical device redirects the laser light to the at least one pin-hole sensor; and
(c) through the at least one pin-hole sensor, measuring shape, quality, and location of the non-stationary laser beams during in-build processing.

17. The method of claim 16, further comprising affixing a fiber optic cable to each pin-hole sensor, wherein each fiber optic cable has a proximal end at which the laser light is received through the pin-hole sensor, and a distal end to which the laser light is delivered to a photodetector.

18. The method of claim 16, wherein the shape, quality, and location of the non-stationary laser beams is measured at any location within the field of view of each of the multiple lasers, wherein an overlapping region is formed between the field of view of each of the multiple lasers.

19. The method of claim 18, wherein the at least one pin-hole sensor can measure the shape, quality, and location of the non-stationary laser beams at a center point, an extremity, and in the overlapping regions of the field of view.

20. The method of claim 16, further comprising traversing the actuation device the length of the field of view of each laser.

* * * * *